US012513285B2

(12) United States Patent
Yu

(10) Patent No.: US 12,513,285 B2
(45) Date of Patent: *Dec. 30, 2025

(54) IMAGE AND VIDEO DATA PROCESSING METHOD AND SYSTEM

(71) Applicant: Jianghong Yu, Beijing (CN)

(72) Inventor: Jianghong Yu, Beijing (CN)

( * ) Notice: Subject to any disclaimer, the term of this patent is extended or adjusted under 35 U.S.C. 154(b) by 335 days.

This patent is subject to a terminal disclaimer.

(21) Appl. No.: 17/727,791

(22) Filed: Apr. 24, 2022

(65) Prior Publication Data
US 2022/0272325 A1 Aug. 25, 2022

Related U.S. Application Data

(63) Continuation-in-part of application No. 17/525,900, filed on Nov. 13, 2021, and a continuation-in-part of
(Continued)

(30) Foreign Application Priority Data

Apr. 9, 2020 (CN) .......................... 202010276253.7
Jun. 5, 2020 (CN) .......................... 202010504349.4
(Continued)

(51) Int. Cl.
H04N 19/105 (2014.01)
H04N 19/147 (2014.01)
H04N 19/172 (2014.01)

(52) U.S. Cl.
CPC ......... H04N 19/105 (2014.11); H04N 19/147 (2014.11); H04N 19/172 (2014.11)

(58) Field of Classification Search
CPC .. H04N 19/105; H04N 19/147; H04N 19/172; H04N 19/136; H04N 19/176; H04N 19/117
See application file for complete search history.

(56) References Cited

U.S. PATENT DOCUMENTS

2008/0243518 A1  10/2008  Oraevsky et al.
2015/0131748 A1   5/2015  Ono et al.
2022/0408097 A1*  12/2022  Lin .................... H04N 19/136

FOREIGN PATENT DOCUMENTS

CN    1922887 A    2/2007
CN  101984666 A    3/2011
(Continued)

OTHER PUBLICATIONS

Liang Simon Fraser Univ (Canada) Jet al: "Error resilient DCT image coding with pre/post-filtering and Wiener filtering", Visual Communications and Image Processing; Dec. 7-Jul. 15, 2005; Beijing,, Jul. 12, 2005 (Jul. 12, 2005), XP030080964.
(Continued)

Primary Examiner — Joseph W Becker

(57) ABSTRACT

In a data processing method and system, an original frame is divided into a plurality of units, and an amplitude of each unit in an intermediate-frequency to high-frequency region is modulated with different boundary adjustment coefficients. If an amplitude of a current unit in an intermediate-frequency to high-frequency region is high, a boundary adjustment coefficient greater than 0 and less than 1 is used to decrease the amplitude in this region, thereby reducing an amount of data information and improving data compression efficiency. If an amplitude of a current unit in an intermediate-frequency to high-frequency region is low, a boundary adjustment coefficient greater than 1 is used to increase the amplitude in this region to avoid loss of details. In data decompression, boundary compensation is performed for the amplitude of each unit in the intermediate-frequency to high-frequency region with a boundary compensation coefficient corresponding to the boundary adjustment coefficient.

24 Claims, 11 Drawing Sheets

Related U.S. Application Data application No. 17/384,805, filed on Jul. 26, 2021, now Pat. No. 11,503,306, said application No. 17/525,900 is a continuation-in-part of application No. 17/384,805, filed on Jul. 26, 2021, which is a continuation-in-part of application No. 17/324,103, filed on May 19, 2021, now Pat. No. 11,528,488, application No. 17/727,791 is a continuation-in-part of application No. 17/324,103, filed on May 19, 2021, now Pat. No. 11,528,488, which is a continuation-in-part of application No. 17/086,407, filed on Nov. 1, 2020, now Pat. No. 11,064,207.

(30) Foreign Application Priority Data

| Aug. 20, 2020 | (CN) | ......................... 202010841245.2 |
| Jan. 5, 2021 | (CN) | ......................... 202110008566.9 |
| Mar. 1, 2021 | (CN) | ......................... 202110225315.6 |
| Mar. 30, 2021 | (WO) | ................ PCT/CN2021/083839 |
| May 28, 2021 | (CN) | ......................... 202110594135.5 |
| Aug. 13, 2021 | (WO) | ................ PCT/CN2021/112551 |

(56) References Cited

FOREIGN PATENT DOCUMENTS

| CN | 102158701 A | 8/2011 |
| CN | 104079947 A | 10/2014 |
| CN | 104751850 A | 7/2015 |
| CN | 110349106 A | 10/2019 |

OTHER PUBLICATIONS

Koohyar Minoo (Motorola) et al: "On scalable resolution enhancement of frame-compatible stereoscopic 3D video", 94. MPEG Meeting; Oct. 11-Oct. 15, 2010; Guangzhou; (Motion Picture Expert Group or ISO/IEC JTC1/SC29/WG11), No. M18486; m18486 Oct. 10, 2010 (Oct. 10, 2010), XP030047076.

Tran T D et al: "Regularity-constrained pre- and post-filtering for block DCT-based systems", IEEE Transactions on Signal Processing, IEEE, USA, vol. 51, No. 10, Oct. 1, 2003 (Oct. 1, 2003), pp. 2568-2581, XP011101066.

* cited by examiner

IMAGE AND VIDEO DATA PROCESSING METHOD AND SYSTEM

RELATED APPLICATIONS

This application claims the benefit of priority to Chinese Application 202110594135.5, entitled Data Processing Method and System, filed on May 28, 2021, and is a continuation-in-part of U.S. application Ser. No. 17/525,900, filed Nov. 13, 2021.

U.S. application Ser. No. 17/525,900 claims the benefit of priority to Chinese Patent Application No. 202110008566.9, filed on Jan. 5, 2021, and U.S. application Ser. No. 17/525,900 is also a continuation-in-part of U.S. application Ser. No. 17/384,805, filed on Jul. 26, 2021.

U.S. application Ser. No. 17/384,805 claims the benefit of priority to Chinese Patent Application No. 202110225315.6, filed on Mar. 1, 2021, which further claims the benefit of priority to Chinese Patent Application No. 202010841245.2, filed on Aug. 20, 2020. U.S. application Ser. No. 17/384,805 further claims the benefit of priority to PCT/CN2021/112551, filed on Aug. 13, 2021. U.S. application Ser. No. 17/384,805 is also a continuation-in-part of U.S. application Ser. No. 17/324,103, filed on May 19, 2021.

U.S. application Ser. No. 17/324,103 claims the benefit of priority to Chinese Patent Application No. 202010504349.4, filed on Jun. 5, 2020, and is a continuation-in-part of U.S. application Ser. No. 17/086,407, filed on Nov. 1, 2020 (now U.S. Pat. No. 11,064,207).

U.S. application Ser. No. 17/086,407 (now U.S. Pat. No. 11,064,207) claims the benefit of priority to Chinese Patent Application No. 202010276253.7, filed on Apr. 9, 2020. U.S. application Ser. No. 17/086,407 (now U.S. Pat. No. 11,064,207) also claims the benefit of priority to PCT/CN2021/083839, filed on Mar. 30, 2021.

The contents of the foregoing documents are incorporated herein by reference in their entirety.

TECHNICAL FIELD

This disclosure relates to the data processing field, and in particular, to a data processing method and system.

BACKGROUND

As Internet technologies are increasingly popularized, and in particular, as mobile terminals are popularized, there are more types of data in a communications network. However, with popularity of computers, more data, such as video data and audio data, is occupying more network resources and storage resources. The data usually contains a huge amount of information, often having high requirements on storage and transmission. For ease of storage and transmission, the data is usually compressed, and when needed, the data is restored through decompression of the compressed data. Therefore, data compression and decompression technologies have more applications.

For example, video and image compression technologies have seen more and more applications in the past several decades. A video usually contains a huge amount of information. From the traditional radio, film, and television to current multitudinous surveillance and Internet applications, compressed videos and images are occupying more network resources and storage resources. Therefore, when original data of a video is transmitted from one terminal to another terminal through a network, a lot of network resources are occupied. As a result, it is difficult to have smooth transmission of images in some scenarios of real-time video transmission. Therefore, before video data is transmitted, a data compression device needs to perform compression processing on the video data first to facilitate the transmission. After the compressed video is transmitted to a data decompression device through a transmission medium, the data decompression device then decompresses the video to at least partially restore video images.

The main existing video compression standards in the existing technologies are ITU Recommendations H.264 and H.265. Before transmission, a video is generally subjected to global compression by an encoder according to the ITU Recommendations H.264 and H.265, and then after transmission, the video is subjected to global decompression by a decoder according to the ITU Recommendations H.264 and H.265. However, due to the following reasons, performance of the foregoing processing method for global compression of the video is still not satisfactory in terms of balancing between an amount of calculation and definition of the decompressed video. When processing the original video, according to the ITU Recommendations H.264 and H.265, various complex algorithms need to be used to generate a predictive frame of an original frame, and then a residual between the original frame and the predictive frame is recorded. The closer the predictive frame to the original frame, the smaller the residual, and the smaller the amount of data in an encoded video. To make the encoding easier, a commonly used method is to reduce high-frequency information in the original frame of image by filtering the original frame. According to a Fourier transform, it may be known that frequency information of a boundary part of an object in an image is often relatively rich and that a high-frequency component of the boundary part is usually larger than those in flat regions. Therefore, although the frame image with reduced high-frequency information becomes visually blurred (that is, the definition of the image is reduced), the residual between the predictive frame and the filtered original frame can be made smaller. In this way, an amount of calculation required for video encoding and an encoded data stream are both greatly reduced. However, a frame prediction technology is complex and may consume a lot of computing resources. Taking a video codec system as an example, an average increase in encoding efficiency by 30% to 40% may require an increase in the amount of calculation by approximately 10 times. In addition, after data transmission and decompression, the definition may be reduced, and various types of noise such as a block effect or a ringing effect usually exist. The block effect refers to an occurrence of discontinuity at a block boundary in an image resulting from a block-based Fourier transform in image processing. The ringing effect refers to that in image processing, when spectrum modulation processing is performed on one image, if a selected spectrum modulation function is subjected to a fast value change (that is, there is a region with a drastic derivative change), a grayscale oscillation is generated, accompanying a drastic grayscale change in an output image, as if an air oscillation is generated after ringing of a bell. The noise often occurs at a boundary in an image. If there is strong noise in an output image, people's growing requirements on image clarity cannot be satisfied. Therefore, how to further improve data compression efficiency while improving definition of decompressed data and eliminating the noise has become a goal pursued in the field of data compression and decompression technologies.

Therefore, to improve data transmission efficiency and definition of decompressed data, a data processing method and system having higher compression efficiency and higher definition of decompressed data are needed.

SUMMARY

This disclosure provides a data processing method and system having higher compression efficiency and higher definition of decompressed data. Taking video data as an example, in the data processing method and system, an original frame in original video data may be divided into a plurality of units, an amplitude of each unit in an intermediate-frequency to high-frequency region may be obtained, and the amplitude of each unit in the intermediate-frequency to high-frequency region may be modulated by using different boundary adjustment coefficients, so that an amplitude of the original frame in the intermediate-frequency to high-frequency region may be decreased. If an amplitude of a current unit in an intermediate-frequency to high-frequency region is large, which represents that the current unit includes a strong boundary, a boundary adjustment coefficient greater than 0 and less than 1 may be used to modulate the amplitude of the current unit in the intermediate-frequency to high-frequency region to decrease the amplitude of the current unit in the intermediate-frequency to high-frequency region, thereby reducing signal strength of the current unit in the intermediate-frequency to high-frequency region and reducing an amount of data information, so that data compression efficiency may be improved during a prediction and residual calculation. If an amplitude of a current unit in an intermediate-frequency to high-frequency region is small, which represents that the current unit includes a weak boundary, a boundary adjustment coefficient greater than 1 may be used to modulate the amplitude of the current unit in the intermediate-frequency to high-frequency region to increase the amplitude of the current unit in the intermediate-frequency to high-frequency region, avoid a loss of the weak boundary in the current unit in a data compression (prediction and residual calculation) process, and avoid a loss of details. The data processing method and system can increase an amount of data information of the weak boundary while improving the data compression efficiency, so as to avoid the loss of details caused in the data compression process, that is, reduce data distortion while improving the data compression efficiency.

When performing data decompression on a compressed frame, the method and system may use the units in data compression as units in data decompression, and perform a boundary compensation for the amplitude of each unit in the intermediate-frequency to high-frequency region by using a boundary compensation coefficient corresponding to the boundary adjustment coefficient, so as to compensate for the amplitude decreased in the intermediate-frequency to high-frequency region in the data compression process and obtain a decompressed frame. The boundary compensation corresponds to the boundary adjustment, and a correspondence exists between the boundary compensation coefficient and the boundary adjustment coefficient. The boundary compensation may restore definition of compressed data that undergoes the boundary adjustment to definition of the original frame, or even make the former higher than definition of the original frame. In other words, without significantly increasing an amount of codec calculation, a decoder may at least restore definition of data at a salient frequency in decompressed data to the definition of the original frame, or may even obtain definition higher than that of the original frame.

All boundary adjustment coefficients of the original frame in the boundary adjustment process are greater than 0, and no information in the compressed frame is lost. Therefore, the boundary adjustment coefficient and the boundary compensation coefficient may be designed based on the relationship between the boundary adjustment coefficient and the boundary compensation coefficient and features of the coefficients to restore information in the compressed frame. The method and system thus may significantly improve the data compression efficiency, improve data transmission efficiency, reduce data loss, and avoid the loss of details, while eliminating noise and improving the definition of the decompressed data.

To this end, according to a first aspect, this disclosure provides a data processing method, including: selecting an original frame from original data, where the original frame includes a preset number of bytes of the original data; and performing data compression on the original frame to obtain a compressed frame, where the performing of the data compression includes performing a boundary adjustment on an under-compression frame, where the under-compression-frame includes the original frame and data in any state before the original frame becomes the compressed frame during the data compression, and the boundary adjustment includes: for each unit of a plurality of units in the under-compression frame, modulating an amplitude of the unit in an intermediate-frequency to high-frequency region by using a boundary adjustment coefficient corresponding to the unit to decrease an amplitude of the under-compression frame in the intermediate-frequency to high-frequency region, where the boundary adjustment coefficient is greater than 0.

According to a second aspect, this disclosure provides a data processing system, including at least one storage medium storing a set of instructions for data processing; and at least one processor in communication with the at least one storage medium, where during operation, the at least one processor executes the set of instructions to: select an original frame from original data, where the original frame includes a preset number of bytes of the original data, and perform data compression on the original frame to obtain a compressed frame, where to perform the data compression, the at least one processor further executes the set of instructions to perform a boundary adjustment on an under-compression frame, where the under-compression-frame includes the original frame and data in any state before the original frame becomes the compressed frame during the data compression, and the boundary adjustment includes: for each unit of a plurality of units in the under-compression frame, modulating an amplitude of the unit in an intermediate-frequency to high-frequency region by using a boundary adjustment coefficient corresponding to the unit to decrease an amplitude of the under-compression frame in the intermediate-frequency to high-frequency region, where the boundary adjustment coefficient is greater than 0.

According to a third aspect, this disclosure further provides a data processing method, including: obtaining compressed data that includes a compressed frame that includes a boundary adjustment obtained by performing data compression on an original frame; and performing data decompression on the compressed frame to obtain a decompressed frame, where the data decompression includes performing a boundary compensation on an under-decompression frame that under-decompression frame includes the compressed frame and any state of data before the compressed frame becomes the decompressed frame during the data decompression, and a preset association relationship exists between the boundary compensation and the boundary adjustment.

According to a fourth aspect, this disclosure further provides a data processing system, including at least one storage medium storing a set of instructions for data processing; and at least one processor in communication with the at least one storage medium, where during operation, the at least one processor executes the set of instructions to: obtain compressed data that includes a compressed frame that includes a boundary adjustment obtained by performing data compression on an original frame; and perform data decompression on the compressed frame to obtain a decompressed frame, where the data decompression includes performing a boundary compensation on an under-decompression frame that under-decompression frame includes the compressed frame and any state of data before the compressed frame becomes the decompressed frame during the data decompression, and a preset association relationship exists between the boundary compensation and the boundary adjustment.

Other functions of the data processing method and system provided in this disclosure are partially listed in the following description. Based on the description, content described in the following figures and examples is obvious to a person of ordinary skill in the art. The inventive aspects of the data processing method and system and storage medium provided in this disclosure may be fully explained by practicing or using the method, apparatus, and a combination thereof in the following detailed examples.

BRIEF DESCRIPTION OF DRAWINGS

To clearly describe the technical solutions in the embodiments of this disclosure, the following briefly describes the accompanying drawings for describing the embodiments. Apparently, the accompanying drawings in the following description show merely some exemplary embodiments of this disclosure, and a person of ordinary skill in the art may still derive other drawings from these accompanying drawings without creative efforts.

DETAILED DESCRIPTION

The following description provides specific application scenarios and requirements of this disclosure, to enable a person skilled in the art to make and use content of this disclosure. Various modifications to the disclosed exemplary embodiments are obvious to a person skilled in the art. General principles defined herein may be applied to some exemplary embodiments and applications without departing from the scope of this disclosure. Therefore, this disclosure is not limited to the illustrated embodiments, but is to be accorded the widest scope consistent with the claims.

The terms used herein are only intended to describe specific exemplary embodiments and are not restrictive. For example, as used herein, singular forms "a", "an", and "the" may also include plural forms, unless otherwise clearly indicated in a context. When used in this disclosure, the terms "including", "including", and/or "containing" indicate presence of associated integers, steps, operations, elements, and/or components, yet do not preclude presence of one or more other features, integers, steps, operations, elements, components, and/or groups thereof or addition of other features, integers, steps, operations, elements, components, and/or groups thereof to the system/method.

In view of the following description, these features and other features of this disclosure, operations and functions of related elements of structures, and economic efficiency in combining and manufacturing components can be significantly improved. All of these constitute part of this disclosure with reference to the drawings. However, it should be clearly understood that the drawings are only for illustration and description purposes and are not intended to limit the scope of this disclosure. It should also be understood that the drawings are not drawn to scale.

Flowcharts used in this disclosure show operations implemented by the system according to some exemplary embodiments of this disclosure. It should be understood that operations in the flowcharts may be implemented in a different order. The operations may be implemented in a reverse order or simultaneously. In addition, one or more other operations may be added to the flowcharts, and one or more operations may be removed from the flowcharts.

In a first aspect, this disclosure provides a data processing system 100 (hereinafter referred to as the system 100). In a second aspect, this disclosure describes a data processing method P200 for compressing data. In a third aspect, this disclosure describes a data processing method P300 for decompressing a compressed frame.

Figure 1:
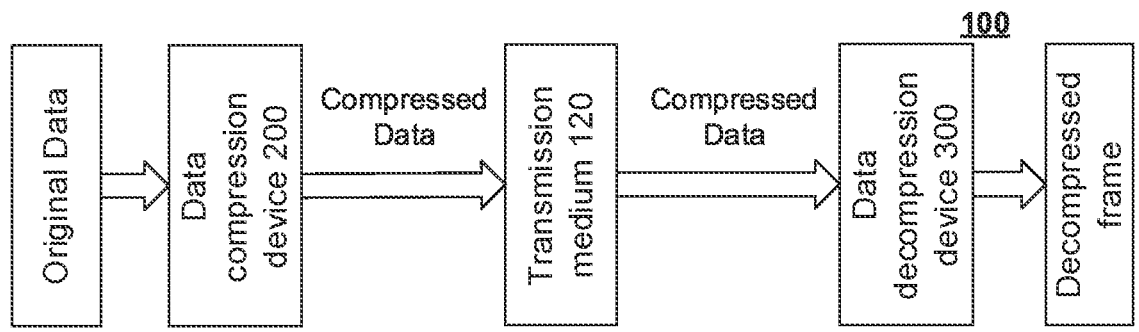
FIG. 1 is a schematic diagram of a data processing system according to some exemplary embodiments of this disclosure.

FIG. 1 is a schematic diagram of the data processing system 100. The system 100 may include a data compression device 200, a data decompression device 300, and a transmission medium 120.

The data compression device 200 may receive an original frame in original data to be compressed, and compress the original data by using the data processing method P200 provided in this disclosure, so as to generate a compressed frame. The data compression device 200 may store data or an instruction(s) for performing the data processing method P200 described in this disclosure, and execute the data and/or the instruction(s).

The data decompression device 300 may receive the compressed frame, and decompress the compressed frame by using the data processing method P300 provided in this disclosure, so as to obtain a decompressed frame. The data decompression device 300 may store data or an instruction(s) for performing the data processing method P300 described in this disclosure, and execute the data and/or the instruction(s).

The data compression device 200 and the data decompression device 300 may include a wide range of apparatuses. For example, the data compression device 200 and the data decompression device 300 may include desktop computers, mobile computing apparatuses, notebook computers (for example, laptop computers), tablet computers, set top boxes, smartphones, and other handheld devices, televisions, cameras, display apparatuses, digital media players, video game consoles, on-board computers, or the like.

As shown in FIG. 1, the data compression device 200 and the data decompression device 300 may be connected by the transmission medium 120. The transmission medium 120 may facilitate transmission of information and/or data. The transmission medium 120 may be any data carrier that can transmit a compressed frame from the data compression device 200 to the data decompression device 300. For example, the transmission medium 120 may be a storage medium (for example, an optical disc), or a wired or wireless communications medium. The communications medium may be a network. In some exemplary embodiments, the transmission medium 120 may be any type of wired or wireless network, or may be a combination thereof. For example, the transmission medium 120 may include a cable network, a wired network, an optical fiber network, a telecommunications network, an intranet, the Internet, a local area network (LAN), a wide area network (WAN), a wireless local area network (WLAN), a metropolitan area network (MAN), a public switched telephone network (PSTN), a Bluetooth network, a ZigBee network, a near field communication (NFC) network, or the like. One or more components in the data decompression device 300 and the data compression device 200 may be connected to the transmission medium 120 to transmit data and/or information. The transmission medium 120 may include a router, a switch, a base station, or another device that facilitates communication from the data compression device 200 to the data decompression device 300. In some exemplary embodiments, the transmission medium 120 may be a storage medium, such as a mass memory, a removable memory, a volatile read-write memory, a read-only memory (ROM), or the like, or any combination thereof. Exemplary mass memories may include non-transitory storage media, such as magnetic disks, optical discs, and solid-state drives. Removable memories may include flash drives, floppy disks, optical discs, memory cards, zip magnetic disks, magnetic tapes, and the like. A typical volatile read-write memory may include a random access memory (RAM). The RAM may include a dynamic RAM (DRAM), a double data rate synchronous dynamic RAM (DDR SDRAM), a static RAM (SRAM), a thyristor RAM (T-RAM), a zero-capacitance RAM (Z-RAM), or the like. The ROM may include a mask ROM (MROM), a programmable ROM (PROM), a programmable erasable ROM (PEROM), an electronically erasable programmable ROM (EEPROM), an optical disc (CD-ROM), a digital versatile disk ROM, or the like. In some exemplary embodiments, the transmission medium 120 may be a cloud platform. For example, the cloud platform may include a private cloud, a public cloud, a hybrid cloud, a community cloud, a distributed cloud, an inter-cloud cloud, or the like, or any combination thereof.

As shown in FIG. 1, the data compression device 200 may receive original data, and executes an instruction(s) of the data processing method P200 described in this disclosure to perform data compression on the original data, to generate a compressed frame, where the compressed frame may be transmitted to the data decompression device 300 through the transmission medium 120; and the data decompression device 300 may execute an instruction(s) of the data processing method P300 described in this disclosure to perform data decompression on the compressed frame, to obtain a decompressed frame.

Figure 2:
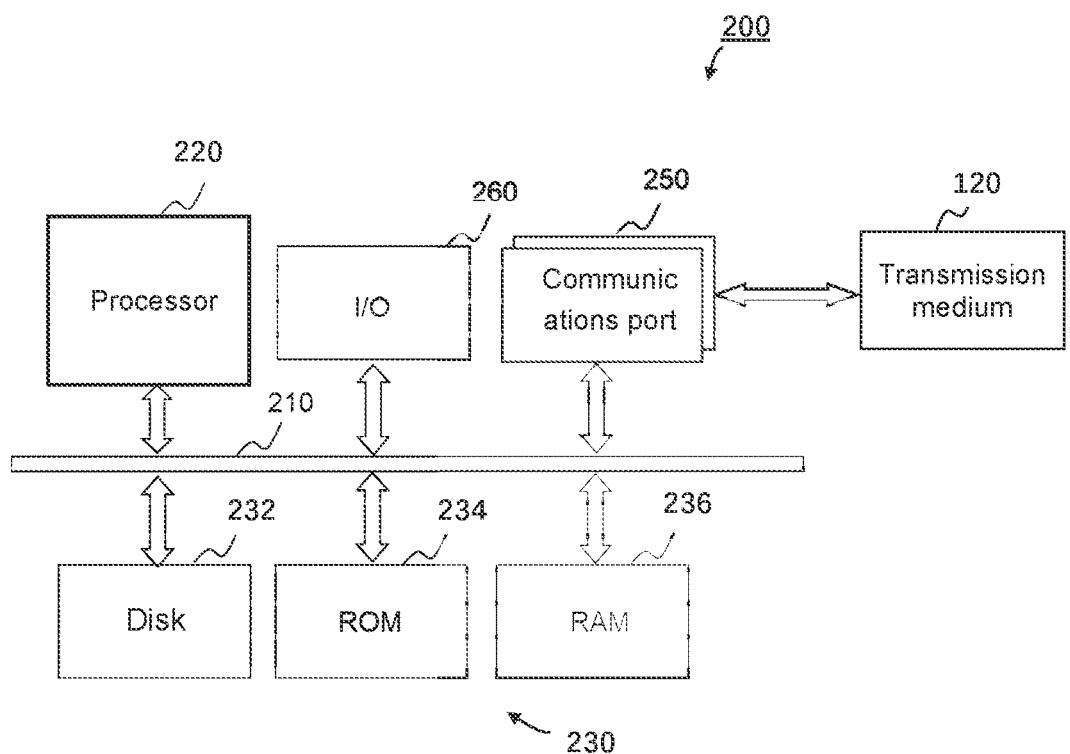
FIG. 2 is a schematic diagram of a data compression device for data processing according to some exemplary embodiments of this disclosure.

FIG. 2 is a schematic diagram of the data compression device 200 for data processing. The data compression device 200 may perform the data processing method P200 described in this disclosure. The data processing method P200 is described in other parts of this disclosure.

As shown in FIG. 2, the data compression device 200 may include at least one storage medium 230 and at least one compression processor 220. In some exemplary embodiments, the data compression device 200 may further include a communications port 250 and an internal communications bus 210. In addition, the data compression device 200 may further include an I/O component 260.

The internal communications bus 210 may connect different system components, including the storage medium 230 and the compression processor 220.

The I/O component 260 supports input/output between the data compression device 200 and another component.

The storage medium 230 may include a data storage apparatus. The data storage apparatus may be a non-transitory storage medium, or may be a transitory storage medium. For example, the data storage apparatus may include one or more of a magnetic disk 232, a read-only memory (ROM) 234, or a random access memory (RAM) 236. The storage medium 230 may further include at least one instruction set stored in the data storage apparatus. The instruction set may be computer program code, and the computer program code may include a program, a routine, an object, a component, a data structure, a process, a module, and the like for performing the data processing method provided in this disclosure.

The communications port 250 may be used by the data compression device 200 to perform external data communications. For example, the data compression device 200 may be connected to the transmission medium 120 through the communications port 250.

The at least one compression processor 220 may be in communication with the at least one storage medium 230 through the internal communications bus 210. The at least one compression processor 220 may be configured to execute the at least one instruction set. When the system 100 operates, the at least one compression processor 220 reads the at least one instruction set, and performs the data processing method P200 based on an instruction of the at least one instruction set. The compression processor 220 may perform all steps included in the data processing method P200. The compression processor 220 may be in a form of one or more processors. In some exemplary embodiments, the compression processor 220 may include one or more hardware processors, for example, a microcontroller, a microprocessor, a reduced instruction set computer (RISC), an application-specific integrated circuit (ASIC), an application-specific instruction set processor (ASIP), a central processing unit (CPU), a graphics processing unit (GPU), a physical processing unit (PPU), a microcontroller unit, a digital signal processor (DSP), a field programmable gate array (FPGA), an advanced RISC machine (ARM), a programmable logic device (PLD), another type of circuit or processor that can implement one or more functions, and the like, or any combination thereof. For a purpose of description, only one compression processor 220 is described in the data compression device 200 in this disclosure. However, it should be noted that the data compression device 200 in this disclosure may further include a plurality of processors. Therefore, the operations and/or method steps disclosed in this disclosure may be performed by one processor in this disclosure, or may be performed jointly by a plurality of processors. For example, if the compression processor 220 of the data compression device 200 in this disclosure performs step A and step B, it should be understood that step A and step B may also be performed jointly or separately by two different compression processors 220 (for example, the first processor performs step A, and the second processor performs step B, or the first processor and the second processor jointly perform step A and step B).

Although the data compression device 200 is described in the foregoing structure, the structure is also applicable to the data decompression device 300. The data decompression device 300 may perform the data processing method P300 described in this disclosure. The data processing method P300 is described in other parts of this disclosure.

The data processing methods P200 and P300 and the system 100 may be used for data compression and decompression to improve the data transmission efficiency and save resources and spaces. The data may be non-real-time data or real-time data. From the traditional radio, film, and television to current multitudinous surveillance and Internet applications, there are various types of data. For example, the data may be non-real-time video data, audio data, or image data. The data may also be real-time map data, real-time sensor data, real-time video surveillance data, network monitoring data, meteorological data, aerospace data, or the like. For example, the data may be map data received from a base station by an autonomous vehicle during driving. The specific type of the data is not limited in this disclosure. In this disclosure, methods and steps used for processing different types of data by the data processing methods P200 and P300 and system 100 are consistent. For ease of presentation, video data processing is used as an example for description in this disclosure.

During data compression and data decompression, the compression and decompression are usually performed in units of frames. A frame is a processing unit that forms a data sequence. Original data may include one or more original frames. Each original frame may include original data of a preset quantity of bytes. During video decompression, the original data may be original video data, and the original frame may be a frame image in the original video data. In a traditional video compression technology, ITU Recommendations H.264 and H.265 are usually used to encode original video data for compressing the video data. A method mainly used by the ITU Recommendations H.264 and H.265 to encode the video data is predictive coding. To be specific, original data in the video data may be predicted to obtain a predictive value, and then the predictive value is subtracted from an original value of the original data to obtain a residual value, thereby compressing the video data. During restoration and decompression (that is, decoding), the original frame may be restored by adding the residual value back to the predictive value.

When performing data compression, the data processing methods P200 and P300 and system 100 provided in this disclosure may use a combination of a boundary adjustment and encoding to reduce an amount of data during encoding, improve compression efficiency of video data, and improve video transmission efficiency, and when performing data decompression, may use a combination of a boundary compensation and decoding to decompress compressed data undergoing the boundary adjustment and encoding, so that decompressed data may be restored to original data.

The data processing method P200 may perform data compression on the video data. The data processing method P200 may use a combination of the encoding (that is, prediction and residual calculation) and the boundary adjustment to perform data compression on an original frame to obtain a compressed frame. Specifically, the data processing method P200 may perform the boundary adjustment and the encoding on an under-compression frame. The under-compression frame includes the original frame and any data state before the original frame becomes the compressed frame during the data compression. The boundary adjustment refers to modulating an amplitude of a spectrum graph of data to be processed. For example, the boundary adjustment may modulate an amplitude of the data to be processed in a selected region in a frequency domain, for example, an amplitude in an intermediate-frequency region or an amplitude in a high-frequency region, or for another example, an amplitude in a low-frequency to intermediate-frequency region, or for another example, an amplitude in an intermediate-frequency to high-frequency region. In some exemplary embodiments, the boundary adjustment may be attenuating an amplitude in a selected region in the frequency domain by using a boundary adjustment coefficient greater than 0 and less than 1, thereby reducing an amount of data information in the data to be processed. A person of ordinary skill in the art understands that a frequency component of the data that undergoes the amplitude attenuation in the selected frequency region would become smaller, and thus the amount of information in the data is reduced. Therefore, the efficiency of encoding the data that undergoes the amplitude attenuation may be improved and a compression ratio may also be improved.

The data processing method P300 may perform data decompression on the compressed frame on which the data compression is performed by the data processing method 200, to obtain a decompressed frame and restore the video data. The data processing method P300 may use a combination of the decoding (that is, restoring the under-compression frame based on a residual value and a predictive value) and the boundary compensation to perform data decompression on the compressed frame, to restore the data from the compressed frame. Specifically, the data processing method P300 may perform the boundary compensation and the decoding on an under-decompression frame. The under-decompression frame may include the compressed frame and any data state before the compressed frame becomes the decompressed frame during the data decompression. The boundary compensation may enable the data that undergoes the boundary adjustment to be fully restored or approximately restored to a state before the boundary adjustment without considering other calculation errors.

Therefore, the data processing methods P200 and P300 and system 100 may significantly improve the compression efficiency of the video data, reduce a data loss during the video data compression, improve video transmission efficiency and a video restoration rate and definition of a decompressed video, and reduce noise in the decompressed video. Specific processes of the boundary adjustment and the boundary compensation will be described in detail in the subsequent description.

When the system 100 performs the data compression on the video data, the boundary adjustment and the encoding may be interchanged in order, or may be performed alternately. Thus, the boundary adjustment may be performed before the encoding or after the encoding. Likewise, when the system 100 performs the data decompression on the compressed frame, the boundary compensation and the decoding may be interchanged in order, or may be performed alternately. It should be noted that, to ensure that the decompressed data information can be restored to the information in the original data, the order of the boundary compensation and the decoding in the data decompression should correspond to the order of the boundary adjustment and the encoding in the data compression, that is, the boundary compensation and the decoding may be reversely symmetrical to the boundary adjustment and the encoding. For example, if the compressed frame is obtained by first performing the boundary adjustment and then performing the encoding, the compressed frame should first undergo the decoding and then undergo the boundary compensation during the data decompression. For ease of description, data in the original frame before data compression processing is denoted as $P_0$, and data in the decompressed frame obtained through decompression by the data decompression device 300 is denoted as $P_4$.

Figure 3B:
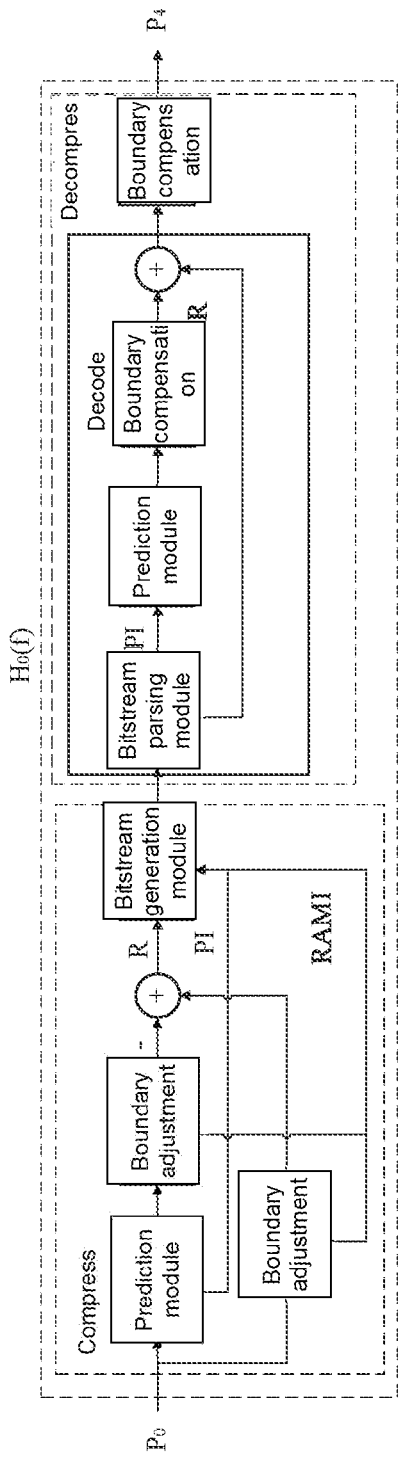
FIG. 3B is a flowchart of data compression and data decompression according to some exemplary embodiments of this disclosure.
Figure 3A:
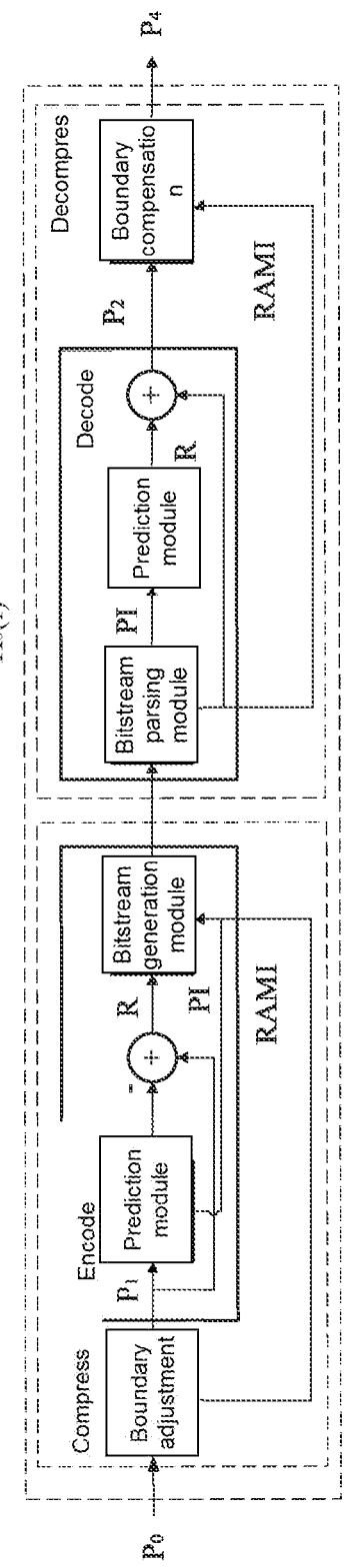
FIG. 3A is a flowchart of data compression and data decompression according to some exemplary embodiments of this disclosure.
Figure 3C:
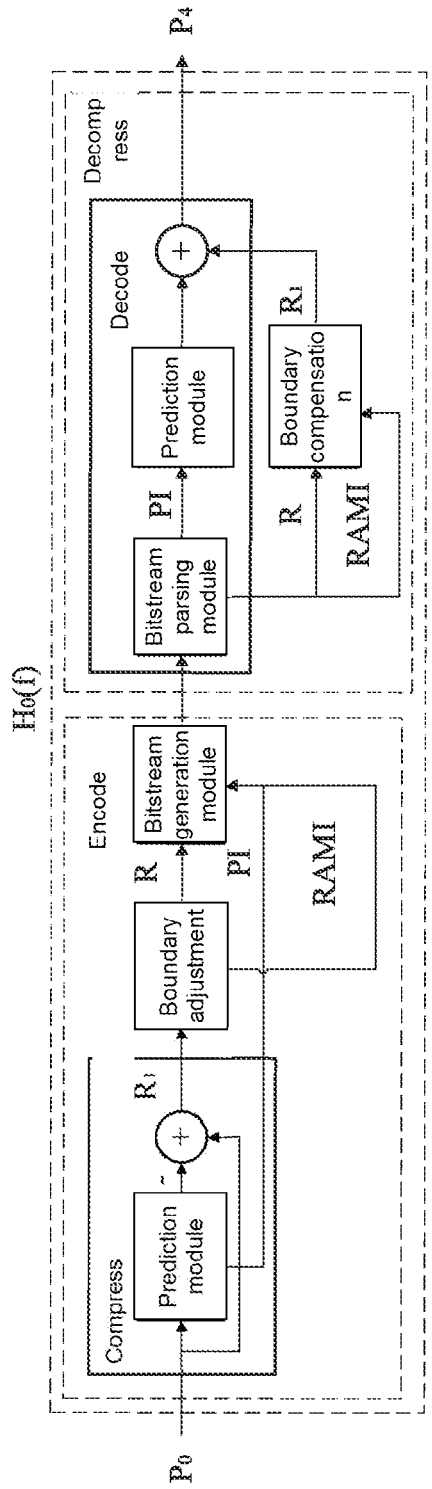
FIG. 3C is a flowchart of data compression and data decompression according to some exemplary embodiments of this disclosure.

In the data processing method P200, when performing the data compression on the original frame, the data compression device 200 may first perform the boundary adjustment on the original frame and then perform the encoding; or may first perform the encoding on the original frame and then perform the boundary adjustment. FIG. 3A to FIG. 3C are flowcharts of data compression and data decompression according to some exemplary embodiments of this disclosure.

FIG. 3A is a flowchart of data compression and data decompression according to some exemplary embodiments of this disclosure. As shown in FIG. 3A, that the data compression device 200 performs data compression on the original data may be: the data compression device 200 first performs the boundary adjustment on the original frame $P_0$, and then performs the encoding, that is, performs a prediction on the original frame after the boundary adjustment and calculates a residual, to obtain predictive data PI and residual data R, and inputs the predictive data PI and the residual data R into a bitstream generation module for combining, to obtain the compressed frame. The compressed frame includes predictive data PI and residual data R. The under-compression frame may be the original frame $P_0$. For ease of presentation, data obtained after the boundary adjustment is defined as an encoding-modulated frame $P_1$. As described above, the boundary adjustment may divide the under-compression frame (original frame $P_0$) into a plurality of units, and the boundary adjustment may be performed on each unit by using a corresponding boundary adjustment coefficient. In some exemplary embodiments, the data compression device 200 may further input an encoding function and the boundary adjustment coefficient corresponding to each unit in the boundary adjustment into the bitstream generation module for combining. To be specific, the compressed frame may further include the encoding function and the boundary adjustment coefficient corresponding to each unit in the boundary adjustment. For ease of presentation, data of the encoding function and the boundary adjustment coefficient corresponding to each unit in the compressed frame is defined as encoded data RAMI (Regional Amplitude Modulation Information). For ease of presentation, in the description of FIG. 3A, it is assumed that the compressed frame includes the encoded data RAMI. The encoding function and the boundary adjustment coefficient in the boundary adjustment are described in detail in the subsequent description. The data compression method shown in FIG. 3A can improve encoding efficiency, further reduce an amount of data in the compressed frame, and improve a compression ratio, while reducing a data loss and avoiding a loss of details.

As shown in FIG. 3A, that the data decompression device 300 performs data decompression on the compressed frame may be: the data decompression device 300 first performs the decoding on the compressed frame, and then performs the boundary compensation. Specifically, the data decompression device 300 may first decode the compressed frame, that is, parse the compressed frame based on a bitstream parsing module, to generate the predictive data PI, the residual data R, and the encoded data RAMI; and then perform a prediction based on the predictive data PI to obtain a predictive frame, and superimpose the residual data R on the predictive frame to obtain a decoded frame. For ease of description, data in the decoded frame is denoted as $P_2$. Then the data decompression device 300 performs the boundary compensation on the decoded frame $P_2$ based on the encoded data RAMI by using decoded data corresponding to the encoded data RAMI, to obtain and output the decoded frame $P_4$. The under-decompression frame may be the decoded frame $P_2$. As described above, the boundary compensation may divide the under-decompression frame (decoded frame $P_2$) into a plurality of units, and the boundary compensation is performed on each unit by using a boundary compensation coefficient corresponding to the boundary adjustment coefficient. The decoded data may include a decoding function and the boundary compensation coefficient corresponding to each unit. The decoding function corresponds to the encoding function. The boundary compensation coefficient corresponds to the boundary adjustment coefficient. Therefore, the data decompression device 300 can determine, based on the encoded data RAMI, the decoding function and the boundary compensation coefficient corresponding to each unit. The decoding function and the boundary compensation coefficient corresponding to the boundary compensation are described in detail in the subsequent description. For ease of presentation, a transfer function between the decompressed frame $P_4$ and the original data $P_0$ is defined as a global spectrum modulation function $H_0(f)$. The manner shown in FIG. 3A may reduce the amount of data in the compressed frame, and therefore improve the compression ratio and encoding efficiency of the original data, and improve transmission efficiency of the original data, while reducing the data loss and avoiding the loss of details.

Alternatively, that the data compression device 200 performs data compression on the original data may be: the boundary adjustment is integrated into the encoding process. The boundary adjustment may be performed at any stage in the encoding process. Correspondingly, the boundary compensation may also be performed at a corresponding stage in the decoding process.

FIG. 3B is a flowchart of data compression and data decompression according to some exemplary embodiments of this disclosure. As shown in FIG. 3B, that the data compression device 200 performs data compression on the original data may be: the data compression device 200 first performs a prediction on the original frame $P_0$ to obtain a predictive frame and predictive data PI, then performs the boundary adjustment on the original frame $P_0$ and the predictive frame and then calculates a residual to obtain residual data R, and inputs the predictive data PI, the residual data R, and the encoded data RAMI into a bitstream generation module for combining, to obtain the compressed frame. The under-compression frame may be the predictive frame and the original frame $P_0$. Specific operations of the data compression shown in FIG. 3B are the same as those of the manner shown in FIG. 3A, except that an order of operations is different. Content of the boundary adjustment is described in detail in the subsequent description.

As shown in FIG. 3B, that the data decompression device 300 performs data decompression on the compressed frame may be: the data decompression device 300 performs the boundary compensation on the compressed frame in the decoding process. Specifically, the data decompression device 300 may first parse the compressed frame based on a bitstream parsing module, to generate the predictive data PI, the residual data R, and the encoded data RAMI; perform a prediction based on the predictive data PI to obtain a predictive frame; perform the boundary compensation on the predictive frame based on the encoded data RAMI by using corresponding decoded data; and superimpose the residual data R on the predictive frame that undergoes the boundary compensation, and perform the boundary compensation on superimposed data to obtain the decompressed frame $P_4$. The under-decompression frame may be the predictive frame, and the superimposed data of the predictive frame and the residual data R. For ease of description, data in the superimposed frame (data) is denoted as $P_3$. Specifically, a specific process of performing the boundary compensation on the boundary of the superimposed frame $P_3$ is described in detail below.

The manner shown in FIG. 3B may reduce the amount of data in the compressed frame, and therefore improve the compression ratio and encoding efficiency of the original data, and improve transmission efficiency of the original data, while reducing the data loss and avoiding the loss of details.

FIG. 3C is a flowchart of data compression and data decompression according to some exemplary embodiments of this disclosure. As shown in FIG. 3C, that the data compression device 200 performs data compression on the original data may be: the data compression device 200 first performs a prediction on the original frame $P_0$ and calculates a residual, to obtain predictive data PI and a residual $R_1$, and then performs the boundary adjustment on the residual $R_1$ to obtain the residual data R; and inputs the residual data R that undergoes the boundary adjustment, the predictive data PI, and the encoded data RAMI into a bitstream generation module for combining, to generate the compressed frame. The under-compression frame may be the residual $R_1$. Specific operations of data compression shown in FIG. 3C are the same as those of the manner shown in FIG. 3A, except that an order of operations is different. Content of the boundary adjustment is described in detail in the subsequent description.

As shown in FIG. 3C, that the data decompression device 300 performs data decompression on the compressed frame may be: the data decompression device 300 parses the compressed frame based on a bitstream parsing module, to generate the predictive data PI and the residual data R; then performs a prediction based on the predictive data PI to obtain a predictive frame; performs the boundary compensation on the residual data R based on the encoded data RAMI by using corresponding decoded data, to obtain the residual $R_1$; and superimposes the residual $R_1$ on the predictive frame to obtain the decompressed frame $P_4$. The under-decompression frame may be the residual data R.

The manner shown in FIG. 3C may reduce the amount of data in the compressed frame, and therefore improve the compression ratio and encoding efficiency of the original data, and improve transmission efficiency of the original data, while reducing the data loss and avoiding the loss of details.

Figure 4A:
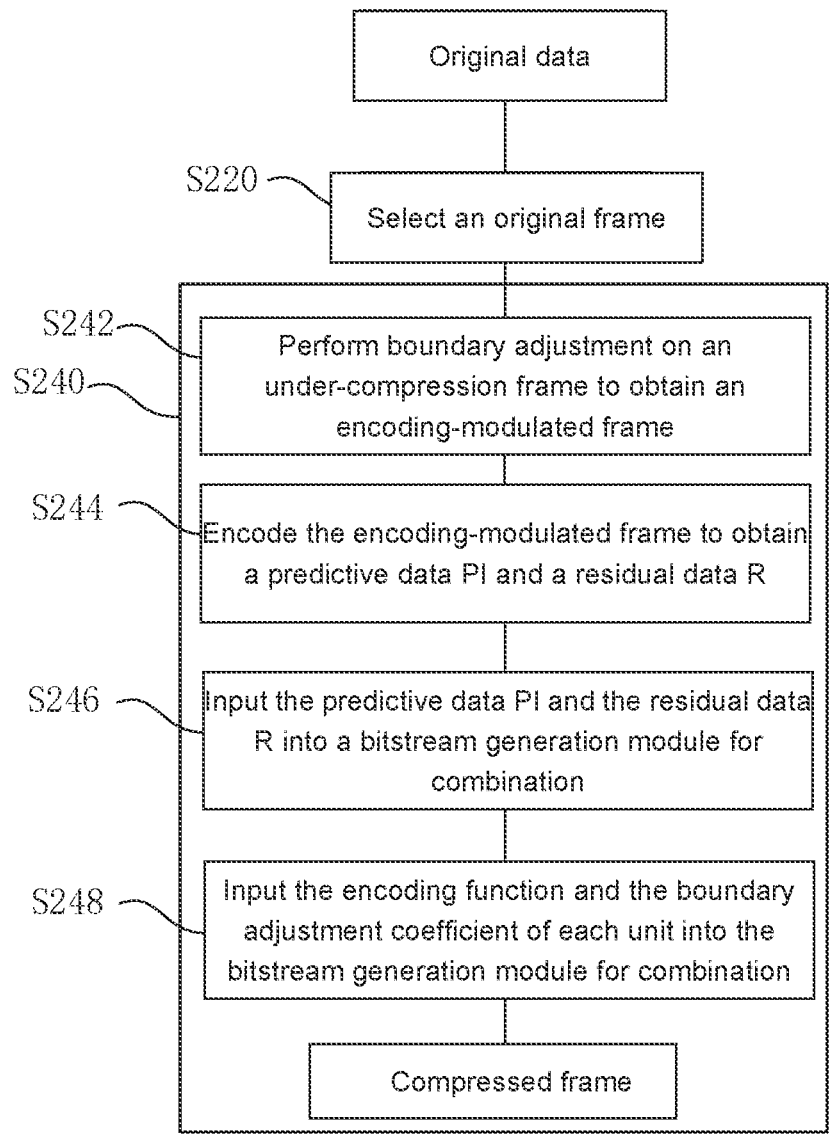
FIG. 4A is a flowchart of a data processing method for data compression according to some exemplary embodiments of this disclosure.

FIG. 4A is a flowchart of the data processing method P200 for data compression. As described above, the data compression device 200 may perform the data processing method P200. Specifically, the storage medium of the data compression device 200 may store at least one instruction set. The instruction set may be configured to instruct the compression processor 220 in the data compression device 200 to implement the data processing method P200. When the data compression device 200 operates, the compression processor 220 may read the instruction set and perform the data processing method P200. As shown in FIG. 4A, the method P200 may include the following steps.

S220. Select an original frame $P_0$ from original data.

A frame is a processing unit that makes up a data sequence. In data processing, calculation is often performed in the unit of frame. The original data may include one or more original frames. The original frame $P_0$ includes original data of a preset quantity of bytes. As described above, this disclosure is described by using video data as an example. Therefore, the original data may be original video data, and the original frame may be a frame image in the original video data. In step S220, the data compression device 200 may select some frame images in the original data as the original frames $P_0$, or may select all frame images in the original data as the original frames $P_0$. The data compression device 200 may select the original frame based on an application scenario of the original data. If the original data is applied in a scenario that does not require high precision and compression quality, some frame images may be selected as the original frames $P_0$. For example, for surveillance images of a quiet place, no foreign object comes into presence in most cases; therefore, most frame images of the surveillance images of the quiet place are the same, and the data compression device 200 may select some frame images as the original frames $P_0$ for compression and transmission. For another example, to ensure a desirable viewing effect of a high-definition television video, the data compression device 200 may select all frame images as the original frames $P_0$ for compression and transmission.

S240. Perform the data compression on the original frame $P_0$ to obtain a compressed frame.

The data compression may include performing the boundary adjustment and the encoding on an under-compression frame. The performing of the boundary adjustment on the under-compression frame may be: inputting the under-compression frame into a boundary adjuster to perform the boundary adjustment. The under-compression frame may include the original frame $P_0$ and any data state before the original frame $P_0$ becomes the compressed frame during the data compression. For example, the under-compression frame includes the original frame $P_0$ and any data state of the original frame $P_0$ during the boundary adjustment and the encoding, for example, the original frame, a predictive frame, and a residual frame.

The boundary adjustment refers to modulating an amplitude of a spectrum graph of the under-compression frame. For example, the boundary adjustment may modulate an amplitude of the under-compression frame in a selected region in frequency domain, for example, an amplitude in an intermediate-frequency region or an amplitude in a high-frequency region, or for another example, an amplitude in a low-frequency to intermediate-frequency region, or for another example, an amplitude in an intermediate-frequency to high-frequency region. In some exemplary embodiments, the boundary adjustment may modulate an amplitude in a selected region in frequency domain by using a boundary adjustment coefficient. For example, the boundary adjustment may be attenuating an amplitude in a selected region in frequency domain by using a boundary adjustment coefficient greater than 0 and less than 1, thereby reducing an amount of data information in the under-compression frame. For different forms of data, a receiver's sensitivity to frequencies is different. Therefore, in the data compression operation, different regions in frequency domain may be selected for amplitude attenuation based on the different forms of data. Intermediate-frequency to high-frequency components in a spectrum of a frame of data are mainly centralized in a region in which data changes dramatically in the frame of data, that is, boundary data of the data. As described above, using the video data as an example, for example, for a frame image, intermediate-frequency to high-frequency data is mainly concentrated on a boundary of an object in the image, that is, boundary data of the frame image. There are rich intermediate-frequency information and high-frequency information at an edge of the object in the image, and an intermediate-frequency region and a high-frequency region carry more data. Therefore, decreasing an amplitude in an intermediate-frequency to high-frequency region may visually blur boundary data of the under-compression frame, and also greatly reduce an amount of information in the image. It should be noted that decreasing an amplitude in a low-frequency region may also reduce the amount of information in the image. In this disclosure, using the video data as an example, the boundary adjustment may be modulating the amplitude of the under-compression frame in the intermediate-frequency to high-frequency region, for example, attenuating the amplitude in the intermediate-frequency to high-frequency region to reduce an amount of data information in the intermediate-frequency to high-frequency region. A person of ordinary skill in the art may understand that, as compared with a case without boundary adjustment processing, an amplitude in an intermediate-frequency to high-frequency region in an intermediate state frame that undergoes the boundary adjustment processing is attenuated, and an amount of data information is also reduced. Therefore, the intermediate state frame that undergoes the boundary adjustment processing has a higher compression ratio in encoding.

Using video data compression as an example, the data processing method P200 may use a combination of the boundary adjustment and the encoding to compress the original frame $P_0$, so as to modulate the amplitude in the intermediate-frequency to high-frequency region, reduce the amount of data information, and further improve a compression ratio of the video data and efficiency of video transmission. As described above, during the data compression of the original frame $P_0$, the boundary adjustment and the encoding may be interchanged in order, or may be performed alternately. Step S240 may include at least one of the data compression methods shown in FIG. 3A, FIG. 3B, and FIG. 3C. For ease of presentation, step S240 is described in detail by using the manner shown in FIG. 3A as an example in this disclosure. In other words, the data compression device 200 first performs the boundary adjustment on the original frame $P_0$ to attenuate an amplitude of the original frame $P_0$ in the intermediate-frequency to high-frequency region, so as to blur boundary information of the original frame $P_0$, obtain an encoding-modulated frame $P_1$, reduce an amount of information in the original frame $P_0$, and reduce space resources occupied by the original frame $P_0$ after the compression; then performs the encoding (that is, a prediction and residual calculation) on the encoding-modulated frame $P_1$, and performs a prediction on the encoding-modulated frame $P_1$ to obtain a predictive frame and predictive data PI of the encoding-modulated frame $P_1$; then performs subtraction between the encoding-modulated frame $P_1$ and the predictive frame of the encoding-modulated frame $P_1$ to obtain residual data R; and inputs the residual data R, the predictive data PI, and the encoded data RAMI into the bitstream generation module for combining, to obtain the compressed frame. The data processing method P200 can improve encoding efficiency of the encoding-modulated frame $P_1$, further reduce an amount of data in the compressed frame, improve encoding efficiency, and improve the compression ratio. Because an object of the boundary adjustment is the original frame $P_0$, the under-compression frame is the original frame $P_0$. Using the video data as an example, in step S240, performing the data compression on the under-compression frame (original frame) may include the following steps performed by the at least one compression processor 220 of the data compression device 200.

Figure 4B:
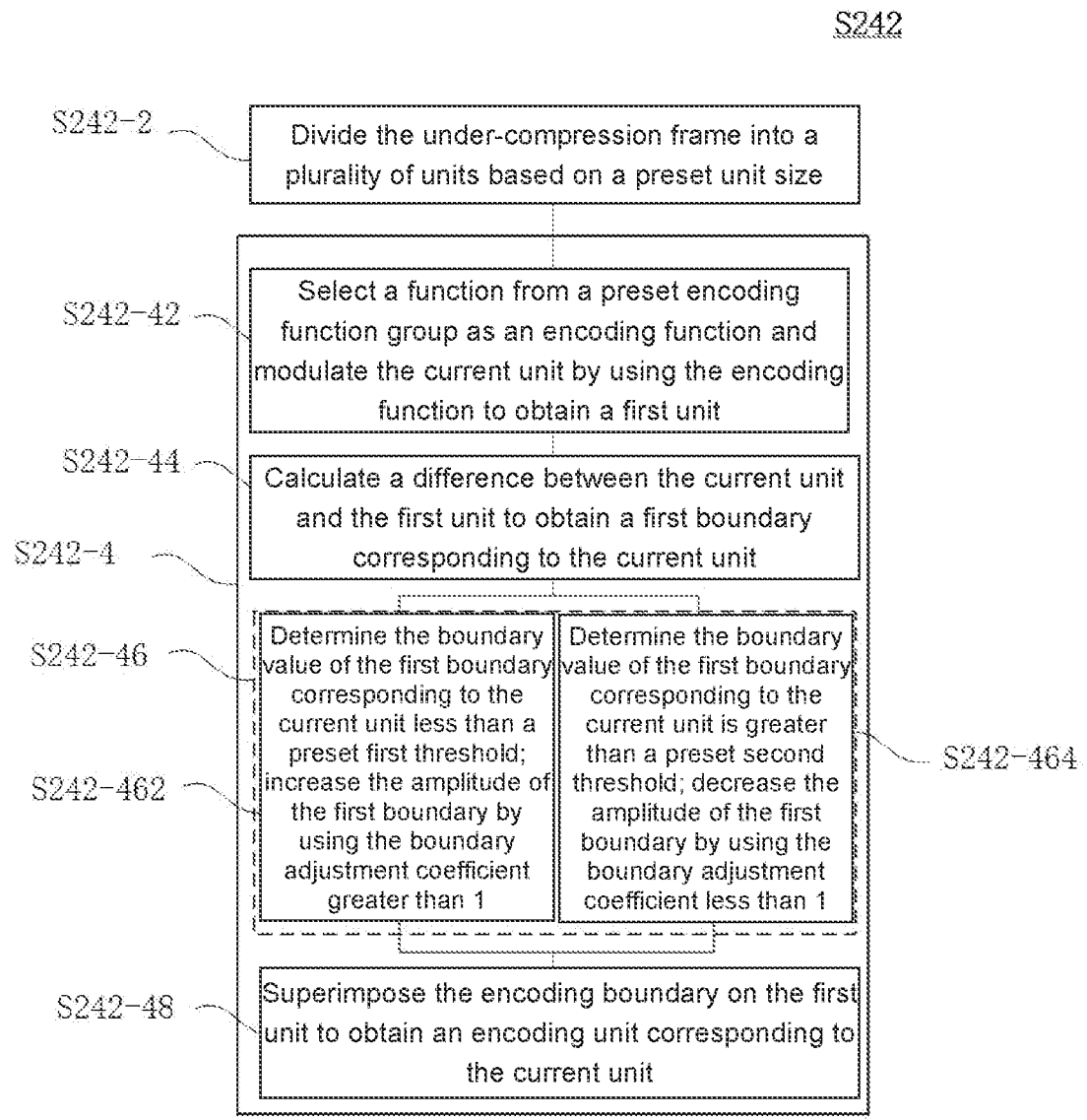
FIG. 4B is a flowchart of a boundary adjustment according to some exemplary embodiments of this disclosure.
Figure 5:
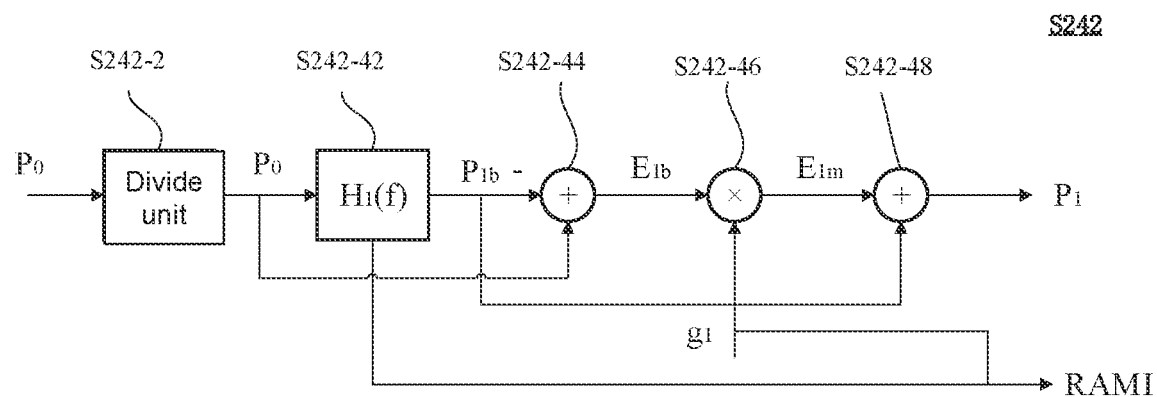
FIG. 5 is a structural block diagram of a boundary adjustment according to some exemplary embodiments of this disclosure.

S242. Perform the boundary adjustment on the under-compression frame (original frame $P_0$) to obtain the encoding-modulated frame $P_1$. FIG. 4B is a flowchart of a boundary adjustment according to some exemplary embodiments of this disclosure. FIG. 5 is a structural block diagram of a boundary adjustment according to some exemplary embodiments of this disclosure. As shown in FIG. 4B and FIG. 5, step S242 may include the following steps performed by the at least one compression processor 220 of the data compression device 200.

S242-2. Divide the under-compression frame (original frame $P_0$) into a plurality of units based on a preset unit size.

As we know, during the encoding of image data and video data, a data processing unit processed may be one frame of data, or may be a part of one frame of data. For example, one frame of data may be divided into several regions, and then each region is encoded separately. Using the video data as an example, the region may be a frame or a field image, or a part of a frame or a field image. For example, an image in video encoding is further split into slices, tiles, coding units (CU), macroblocks, blocks, or subblocks. Generally, a region is an N×N square or an M×N rectangle. The region includes but is not limited to the foregoing terms. For ease of description, each region is defined as a unit. The foregoing unit can be used as an adjustment object in the boundary adjustment, and the boundary adjustment is performed on each unit. Herein, a size of the unit may be randomly selected according to a requirement, that is, values of M and N may be any integers, for example, 4, 8, 16, 32, 16, 128, or 256, or may be even smaller, for example, 2. In some exemplary embodiments, the unit may include only one pixel. The higher the resolution of a frame image, the larger the size of the unit. As described above, the under-compression frame (original frame $P_0$) may be divided into a plurality of units. For ease of description, data of a unit in an ith row and a jth column in the original frame $P_0$ is defined as $P_0^{ij}$.

S242-4. For each unit, modulate an amplitude of the unit in the intermediate-frequency to high-frequency region by using a boundary adjustment coefficient corresponding to the unit.

Using the video data as an example, the boundary adjustment may be: for each of the plurality of units in the under-compression frame (original frame $P_0$), modulating the amplitude of the unit in the intermediate-frequency to high-frequency region by using the boundary adjustment coefficient corresponding to the unit, to decrease a global amplitude of the under-compression frame (original frame $P_0$) in the intermediate-frequency to high-frequency region. Content of the boundary adjustment coefficient is described in detail in the subsequent description. When performing the boundary adjustment on the unit $P_0^{ij}$ in the ith row and the jth column, step S242-4 may include: for the current unit $P_0^{ij}$, performing the following:

S242-42. Select a function from a preset encoding function group as an encoding function $H_1^{ij}(f)$, and modulate the current unit $P_0^{ij}$ by using the encoding function $H_1^{ij}(f)$, to obtain a first unit $P_{1b}^{ij}$, so that a component of the unit in a low-frequency region in a frequency domain is retained while a component of the unit in the intermediate-frequency to high-frequency region is attenuated.

$H_1^{ij}(f)$ represents the encoding function corresponding to the current unit $P_0^{ij}$ in the ith row and the jth column. In frequency domain, the encoding function $H_1^{ij}(f)$ may be a low-pass filter, to smoothly decrease the amplitude of the current unit $P_0^{ij}$ of the original frame $P_0$ in frequency domain, and retain the component of the current unit $P_0^{ij}$ of the original frame $P_0$ in the low-frequency region in frequency domain, but attenuate the component in the intermediate-frequency to high-frequency region, thereby obtaining the first unit $P_{1b}^{ij}$ corresponding to the current unit $P_0^{ij}$. To reduce an amount of calculation required in an implementation process and avoid a ringing effect, the encoding function $H_1^{ij}(f)$ should achieve a smooth transition of the amplitude of the current unit $P_0^{ij}$ in frequency domain. The encoding function $H_1^{ij}(f)$ may be any smoothly transitioned low-pass filter in any form. This is not limited in this disclosure.

It should be noted that, to avoid the ringing effect, the encoding function $H_1^{ij}(f)$ is a smoothly transitioned curve to avoid a drastic change of an amplitude modulation gain in the curve. As described above, the ringing effect refers to that in image processing, when spectrum modulation processing is performed on one image, if the selected encoding function $H_1^{ij}(f)$ is subjected to a fast change, "ringing" occurs in the image. The "ringing" is an oscillation that accompanies a drastic grayscale change in an output image, as if an air oscillation is generated after ringing of a bell. The ringing effect often occurs at a boundary of an image.

Performing modulation on the current unit $P_0^{ij}$ by using the encoding function $H_1^{ij}(f)$ may be expressed as convolving the current unit $P_0^{ij}$ by using an encoding convolution kernel in time domain. Performing modulation on the current unit $P_0^{ij}$ by using the encoding function $H_1^{ij}(f)$ may be expressed as multiplying the current unit $P_0^{ij}$ by a transfer function $H_1^{ij}(f)$ (that is, the encoding function) in frequency domain, or performing corresponding convolution calculation in time domain. If the current unit $P_0^{ij}$ is digitized data, the convolution calculation may be convolution calculation performed by selecting an encoding convolution kernel corresponding to the encoding function $H_1^{ij}(f)$. For ease of description, the convolution in time domain is used as an example in this disclosure to describe the modulation performed on the current unit $P_0^{ij}$ by using the encoding function $H_1^{ij}(f)$. However, a person skilled in the art should understand that a manner of modulation by multiplication by the encoding function $H_1^{ij}(f)$ in frequency domain also falls within the protection scope of this disclosure.

The storage medium of the data compression device 200 may store the encoding function group. The encoding function group may include at least one different encoding function. Each encoding function corresponds to one encoding convolution kernel. In other words, the storage medium of the data compression device 200 may include at least one encoding convolution kernel. When convolving the current unit $P_0^{ij}$, the data compression device 200 may randomly select a function from the encoding function group as the encoding function $H_1^{ij}(f)$ corresponding to the current unit $P_0^{ij}$, and use a convolution kernel corresponding to the encoding function $H_1^{ij}(f)$ as the encoding convolution kernel to convolve the current unit $P_0^{ij}$.

When boundary adjustment processing is performed on one image, if a selected encoding function has a drastic value change in a region, a higher-order convolution kernel or convolution kernel combination is required in the implementation process. This means an increase of unnecessary calculation. In addition, a high-order convolution kernel is more likely to cause a strong color oscillation accompanying a drastic grayscale or color change in an output image, and this is referred to as a ringing effect. The ringing effect often occurs at a boundary of an image. The encoding function $H_1^{ij}(f)$ should achieve a smooth transition of the amplitude modulation gain for the current unit $P_0^{ij}$ in frequency domain, so that a drastic change of the amplitude modulation gain can be avoided. For example, when the low-frequency region is not connected to the intermediate-frequency region, the encoding function $H_1^{ij}(f)$ may modulate an amplitude of the current unit $P_0^{ij}$ in a medium-low-frequency region in frequency domain, so that a change of the amplitude modulation gain in the medium-low-frequency region is smooth and continuous.

A ratio of an absolute value of a sum of negative coefficients to a sum of non-negative coefficients in the encoding convolution kernel corresponding to the encoding function $H_1^{ij}(f)$ should be less than 0.1. In some exemplary embodiments, all convolution kernel coefficients in the encoding convolution kernel may be non-negative. Using the video data as an example, when there are a lot of negative coefficients in the encoding convolution kernel, there is a great difference between pixel values at a boundary of an image, and a large pixel value multiplied by a negative coefficient causes a final convolution result to become smaller, that is, a dark pixel is reflected in the image. If a negative number occurs in the convolution result, and an absolute value of the negative number is large, when the convolution result is calculated by using an unsigned integer, a result of calculation using the unsigned integer may be inverted, and an unsigned complementary code value with a negative value may cause the convolution result to become larger, that is, a bright pixel is reflected in the image. Therefore, when the encoding convolution kernel is designed, all coefficients of the encoding convolution kernel may be non-negative, or the ratio of the absolute value of the sum of negative coefficients to the sum of non-negative coefficients in the encoding convolution kernel should be less than 0.1, that is, a few negative coefficients with small absolute values are allowed in the encoding convolution kernel.

Figure 6:
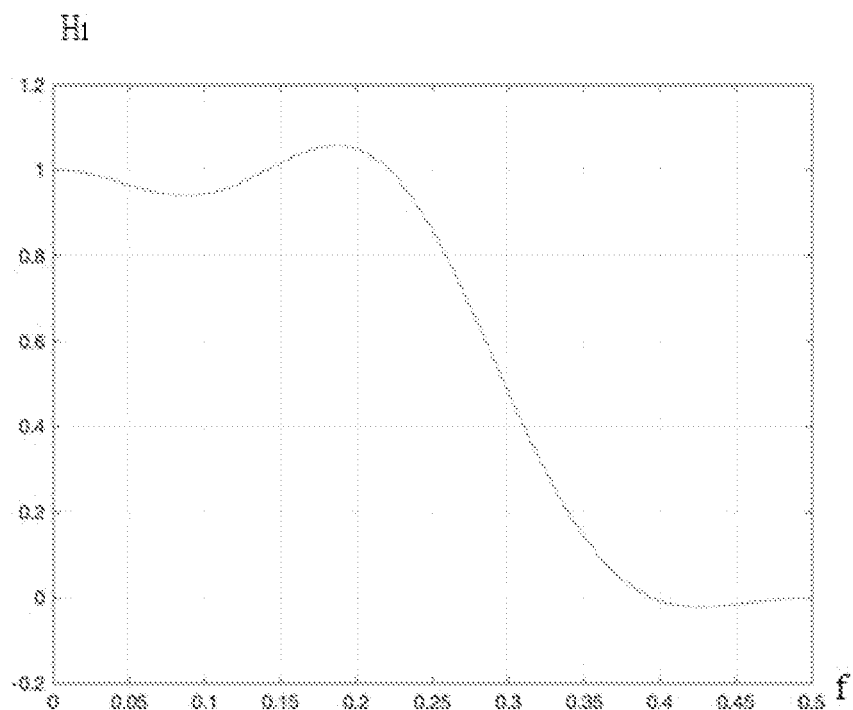
FIG. 6 is a graph of an encoding function according to some exemplary embodiments of this disclosure.

FIG. 6 is a schematic graph of an encoding function $H_1^{ij}(f)$ according to some exemplary embodiments of this disclosure. A horizontal axis is a normalized frequency $f$, and a vertical axis is an amplitude modulation gain $H_1$ of the encoding function $H_1^{ij}(f)$. The normalized frequency f on the horizontal axis may be divided into a low-frequency region, a medium-low-frequency region, an intermediate-frequency region, a medium-high-frequency region, and a high-frequency region. For different types of data, the low-frequency region, the intermediate-frequency region, and the high-frequency region may be defined differently. As shown in FIG. 6, a maximum value of the normalized frequency on the horizontal axis is 0.5. The high-frequency region may include frequencies within (d, 0.5] in the normalized frequency domain, where d is a lower frequency limit of the high-frequency region. For example, d may be any frequency of 0.35, 0.36, 0.37, 0.38, 0.39, 0.4, 0.41, 0.42, 0.43, 0.44, and 0.45 in the normalized frequency domain. In some exemplary embodiments, the high frequencies may include frequencies within a range of (0.33, 0.5] in normalized frequency domain. For example, the high frequencies may include an interval between any two frequencies of 0.33, 0.34, 0.35, 0.36, 0.37, 0.38, 0.39, 0.4, 0.41, 0.42, 0.43, 0.44, 0.45, 0.46, 0.47, 0.48, 0.49, and 0.5 in the normalized frequency domain, where 0.5 is a maximum frequency that is normalized. The intermediate-frequency region may include frequencies within (b, c], where b is a lower frequency limit of the intermediate-frequency region, and c is an upper frequency limit of the intermediate-frequency region. For example, the lower frequency limit b of the intermediate-frequency region may be any frequency of 0.15, 0.16, 0.17, 0.18, 0.19, 0.2, 0.21, 0.22, 0.23, 0.24, 0.25, 0.26, 0.27, and 0.28 in the normalized frequency domain; and the upper frequency limit c of the intermediate-frequency region may be any frequency of 0.35, 0.34, 0.33, 0.32, and 0.31 in the normalized frequency domain. The low-frequency region may include frequencies within [0, a] in the normalized frequency domain, where a is an upper frequency limit of the low-frequency region. The upper frequency limit a of the low-frequency region may be any frequency of 0.01, 0.02, 0.03, 0.04, 0.05, 0.06, 0.07, 0.08, 0.09, 0.10, 0.12, 0.13, 0.14, and 0.15 in the normalized frequency domain. When the low-frequency region is not connected to the intermediate-frequency region, a frequency region between the two is referred to as the medium-low-frequency region. When the intermediate-frequency region is not connected to the high-frequency region, a frequency region between the two is referred to as the medium-high-frequency region.

The encoding function $H_1^{ij}(f)$ may filter out the component in the intermediate-frequency to high-frequency region. A stop band interval in the encoding function $H_1^{ij}(f)$ may be any interval between frequencies 0.15 and 0.50. For example, the stop band interval in the encoding function $H_1^{ij}(f)$ may be within an interval specified by any two values of 0.15, 0.17, 0.19, 0.21, 0.23, 0.25, 0.27, 0.29, 0.31, 0.33, 0.35, 0.37, 0.39, 0.41, 0.43, 0.45, and 0.50. A pass band interval in the encoding function $H_1^{ij}(f)$ may be any interval between frequencies 0 and 0.35. For example, the pass band interval in the encoding function $H_1^{ij}(f)$ may be within an interval specified by any two values of 0, 0.02, 0.04, 0.06, 0.08, 0.10, 0.12, 0.14, 0.15, 0.17, 0.19, 0.21, 0.23, 0.25, 0.27, 0.29, 0.21, 0.23, and 0.35.

It should be noted that FIG. 6 is described only by using the video data as an example. A person skilled in the art should understand that the curve of the encoding function $H_1^{ij}(f)$ is not limited to the form shown in FIG. 6. All encoding functions $H_1^{ij}(f)$ that can smoothly decrease an amplitude of the current unit $P_0^{ij}$ in a frequency domain and retain a component of the current unit $P_0^{ij}$ of the original frame $P_0$ in the low-frequency region in frequency domain while attenuating a component in the intermediate-frequency to high-frequency region, and a linear combination $H_1^{ij}(f)=\Sigma_{m=1}^{n} k_m H_{1m}^{ij}(f)$ of encoding functions $H_1^{ij}(f)$, or a product combination $H_1^{ij}(f)=\Pi_{q=1}^{n} k_g H_{1q}^{ij}(f)$ of encoding functions $H_1^{ij}(f)$, or a combination of a linear combination and a product combination shall fall within the protection scope of this disclosure, where m≥1, $H_1^{ij}(f)=\Sigma_{m=1}^{n} k_m H_{1m}^{ij}(f)$ represents a linear combination of n functions, $H_{1m}^{ij}(f)$ represents an mth function, $k_m$ represents a weight corresponding to the mth function, q≥1, $H_1^{ij}(f)=\Pi_{q=1}^{n} k_g H_q^{ij}(f)$ represents a product combination of the n functions, $k_q$ represents a weight corresponding to a qth function, and $H_{1q}^{ij}(f)$ may be any function.

Table 1 is a parameter table of an encoding convolution kernel according to some exemplary embodiments of this disclosure. Table 1 exemplarily lists parameters of an encoding convolution kernel, where each row in Table 1 represents an encoding convolution kernel. For a video image of 8 bits, it is necessary to ensure that grayscale values of pixels in the first unit $P_F^{ij}$ obtained after the encoding convolution are within a range of 0 to 255. Therefore, in some exemplary embodiments, it is necessary to divide a convolution result by 16. The encoding convolution kernel is obtained through a Fourier transform based on the encoding function $H_1^{ij}(f)$. Table 1 is only an exemplary illustration. A person skilled in the art should know that the encoding convolution kernel is not limited to the parameters shown in Table 1. All encoding convolution kernels that can smoothly decrease the amplitude of the current unit $P_0^{ij}$ in frequency domain and retain the component of the current unit $P_0^{ij}$ of the original frame $P_0$ in the low-frequency region in frequency domain while attenuating the component in the intermediate-frequency to high-frequency region shall fall within the protection scope of this disclosure.

TABLE 1

| 1 | 4 | 6 | 4 | 1 |

As described above, in the boundary adjustment, the data compression device 200 may perform step S242-42 for each unit. After each unit $P_0^{ij}$ is modulated by the encoding function $H_1^{ij}(f)$, a corresponding first unit $P_{1b}^{ij}$ is obtained. Encoding functions $H_1^{ij}(f)$ corresponding to all the units are combined to constitute the encoding function $H_1(f)$. The encoding functions $H_1^{ij}(f)$ corresponding to the units may be combined based on positions of the units to generate the encoding function $H_1(f)$, and the encoding function $H_1(f)$ may be considered as a matrix. It should be noted that when step S242-42 is performed for different units, a same encoding function (that is, an encoding convolution kernel) may be selected, or different encoding functions (that is, encoding convolution kernels) may be selected. To be specific, the encoding functions $H_1^{ij}(f)$ corresponding to the different units $P_0^{ij}$ may be the same, or may be different.

First units $P_{1b}^{ij}$ corresponding to all the units are combined to constitute a first frame $P_{1b}$. The first units $P_{1b}^{ij}$ corresponding to the units may be combined based on the positions of the units to generate the first frame $P_{1b}$, and the first frame $P_{1b}$ is a blurry image. A relationship between $P_0$ and $P_{1b}$ may be expressed in the following formula:

$$P_{1b}=P_0 H_1(f) \tag{1}$$

As shown in FIG. 4B and FIG. 5, when performing the boundary adjustment on the unit $P_0^{ij}$ in the ith row and the jth column, step S242-4 may include: for the current unit $P_0^{ij}$, performing the following:

S242-44. Calculate a difference between the current unit $P_0^{ij}$ and the first unit $P_{1b}^{ij}$, to obtain a first boundary $E_{1b}^{ij}$ corresponding to the current unit $P_0^{ij}$.

Intermediate-frequency to high-frequency components in a spectrum of each frame of data are mainly centralized in a region in which data changes dramatically in the frame of data, that is, boundary data of the data. For example, for a frame image, intermediate-frequency to high-frequency data is mainly concentrated on a boundary of an object in the image, that is, boundary data of the frame image. The encoding function $H_1^{ij}(f)$ can smoothly decrease the amplitude of the current unit $P_0^{ij}$ in a frequency domain to attenuate the component in the intermediate-frequency to high-frequency region. Therefore, the first unit $P_{1b}^{ij}$ may be understood as data excluding boundary information of the current unit $P_0^{ij}$. Then a boundary of the current unit $P_0^{ij}$, that is, the first boundary $E_{1b}^{ij}$, may be obtained by calculating the difference between the current unit $P_0^{ij}$ and the first unit $P_{1b}^{ij}$. Therefore, the first boundary $E_{1b}^{ij}$ includes the component of the current unit $P_0^{ij}$ in the intermediate-frequency to high-frequency region. The first boundary $E_{1b}^{ij}$ includes the boundary information of the current unit $P_0^{ij}$. After each unit $P_0^{ij}$ undergoes step S242-44, a corresponding first boundary $E_{1b}^{ij}$ is obtained. First boundaries $E_{1b}^{ij}$ corresponding to all the units are combined to constitute a first boundary frame $E_{1b}$. The first boundaries $E_{1b}^{ij}$ corresponding to the units may be combined based on the positions of the units to generate the first boundary frame $E_{1b}$. The first boundary frame $E_{1b}$ may be expressed in the following formula:

$$E_{1b}=P_0-P_{1b}=P_0-P_0 H_1(f) \tag{2}$$

As shown in FIG. 4B and FIG. 5, when performing the boundary adjustment on the unit $P_0^{ij}$ in the ith row and the jth column, step S242-4 may include: for the current unit $P_0^{ij}$, performing the following:

S242-46. Modulate an amplitude of the first boundary $E_{1b}^{ij}$ by using the boundary adjustment coefficient corresponding to the current unit $P_0^{ij}$, to obtain an encoding boundary $E_{1m}^{ij}$ corresponding to the current unit $P_0^{ij}$.

For ease of description, the boundary adjustment coefficient corresponding to the boundary adjustment is denoted as $g_1$. A boundary adjustment coefficient corresponding to the unit $P_0^{ij}$ in the ith row and the jth column is defined as $g_1^{ij}$. In a frame image, a strong boundary may exist, or a weak boundary may exist, or both a strong boundary and a weak boundary may exist. The strong boundary may be a boundary with a large difference between adjacent pixels. The weak boundary may be a boundary with a small difference between adjacent pixels. In step S242-2, the original frame $P_0$ is divided into a plurality of units. Therefore, the original frame $P_0$ is divided into a plurality of small regions. If a size of the unit is smaller, boundaries included in the unit are less diversified. Each unit may include only a strong boundary or only a weak boundary when the unit is small enough. Because the original frame $P_0$ is divided into a plurality of units in step S242-2, the data compression device 200 may adjust boundary information of each unit separately.

For a piece of image data or video data, encoding the image data or video data by using the ITU Recommendations H.264 and H.265 may cause a loss of some details of the image or video to some extent. In other words, after a weak boundary with a small difference between adjacent pixels undergoes the encoding processing, the difference between adjacent pixels may become smaller or even disappear, and consequently, details in the image data or video data are lost. Therefore, to avoid a loss of the weak boundary with a small difference between adjacent pixels during the encoding and decoding, the boundary adjustment may enhance an amplitude of the weak boundary with a small difference between adjacent pixels in the intermediate-frequency to high-frequency region, so as to increase the difference between adjacent pixels in the weak boundary, avoid the loss of the weak boundary during the encoding, and avoid the loss of details, so that a detail part can still be retained after the encoding and decoding processing.

A strong boundary with a large difference between adjacent pixels does not disappear after the encoding and decoding processing. The boundary adjustment may attenuate an amplitude of the strong boundary with a large difference between adjacent pixels in the intermediate-frequency to high-frequency region, so as to reduce the difference between adjacent pixels in the strong boundary, reduce data information included in the strong boundary, and improve the compression ratio. Because the difference between adjacent pixels in the strong boundary is large enough, even if the amplitude is attenuated in the boundary adjustment, the retained boundary is still large enough, and does not disappear after the encoding and decoding processing.

Using the video data as an example, when the amplitude of the first boundary $E_{1b}^{ij}$ is modulated by using the boundary adjustment coefficient $g_1^{ij}$, information included in the original frame $P_0$ should be retained as much as possible without any loss, so that the information can be better restored during decompression. Therefore, the boundary adjustment coefficient $g_1^{ij}$ should be greater than 0. In the intermediate-frequency to high-frequency region, an amplitude of the encoding boundary $E_{1m}^{ij}$ processed by using the boundary adjustment coefficient $g_1^{ij}$ is also greater than 0, and no data is lost. Therefore, when the compressed data is decompressed, all the data can be restored. Otherwise, if the boundary adjustment coefficient $g_1^{ij}$ has a zero point, data in a unit corresponding to the zero point in the intermediate-frequency to high-frequency region may be lost, and a decoder cannot restore the lost data during the decompression, and therefore cannot restore the original data.

In step S242-46, the data compression device 200 may determine, based on a boundary value of the first boundary $E_{1b}^{ij}$ corresponding to the current unit $P_0^{ij}$, the boundary adjustment coefficient $g_1^{ij}$ corresponding to the current unit $P_0^{ij}$. Different units $P_0^{ij}$ may have different boundary adjustment coefficients $g_1^{ij}$. The boundary value may be a value corresponding to each pixel in the first boundary $E_{1b}^{ij}$. Step S242-46 may include:

S242-462. Determine that the boundary value of the first boundary $E_{1b}^{ij}$ corresponding to the current unit $P_0^{ij}$ is less than a preset first threshold, and increase the amplitude of the first boundary $E_{1_b}^{ij}$ by using the boundary adjustment coefficient $g_1^{ij}$ that is greater than 1.

S242-464. Determine that the boundary value of the first boundary $E_{1_b}^{ij}$ corresponding to the current unit $P_0^{ij}$ is greater than a preset second threshold, and decrease the amplitude of the first boundary $E_{1_b}^{ij}$ by using the boundary adjustment coefficient $g_1^{ij}$ that is less than 1.

In step S242-462, if the boundary value of the first boundary $E_{1_b}^{ij}$ corresponding to the current unit $P_0^{ij}$ is less than the first threshold, it represents that the current unit includes a weak boundary, including a plurality of fine details. In this case, the boundary adjustment coefficient $g_1^{ij}$ greater than 1 is used to modulate the amplitude of the first boundary $E_{1_b}^{ij}$ corresponding to the current unit $P_0^{ij}$ in the intermediate-frequency to high-frequency region, so as to enhance the amplitude of the first boundary $E_{1_b}^{ij}$ corresponding to the current unit $P_0^{ij}$ in the intermediate-frequency to high-frequency region, maintain a signal-to-noise ratio of the current unit $P_0^{ij}$, avoid the loss of the weak boundary in the current unit $P_0^{ij}$ in the data compression (prediction and residual calculation) process, avoid the loss of details, and ensure an encoding quality. The data processing method P200 can increase an amount of data information of the weak boundary while improving data compression efficiency, to avoid the loss of details caused in the data compression process, that is, reduce data distortion while improving the data compression efficiency. The first threshold may be 5, 10, 15, 20, 25, 30, 35, 40, 45, 50, or the like. In some exemplary embodiments, the first threshold may be smaller, for example, 1, 2, 3, or 4. In some exemplary embodiments, the first threshold may be any number from 5 to 30.

In step S242-464, if the boundary value of the first boundary $E_{1_b}^{ij}$ corresponding to the current unit $P_0^{ij}$ is greater than the second threshold, it represents that the current unit $P_0^{ij}$ includes a strong boundary. In this case, the boundary adjustment coefficient $g_1^{ij}$ greater than 0 and less than 1 is used to modulate the amplitude of the first boundary $E_{1_b}^{ij}$ corresponding to the current unit $P_0^{ij}$ in the intermediate-frequency to high-frequency region, so as to decrease the amplitude of the first boundary $E_{1_b}^{ij}$ corresponding to the current unit $P_0^{ij}$ in the intermediate-frequency to high-frequency region, reduce signal strength of the first boundary $E_{1_b}^{ij}$ corresponding to the current unit $P_0^{ij}$ in the intermediate-frequency to high-frequency region, and reduce the amount of data information, so that the data compression efficiency can be improved during the prediction and residual calculation. The second threshold may be greater than the first threshold, or may be equal to the first threshold.

It should be noted that when the first threshold is unequal to the second threshold, if the boundary value of the first boundary $E_{1_b}^{ij}$ is a boundary value between the first threshold and the second threshold (including the first threshold and the second threshold), the boundary adjustment may not be performed. In this case, the boundary adjustment coefficient $g_1^{ij}$ may be 1.

In some exemplary embodiments, a storage medium of the data compression device 200 may prestore a first boundary adjustment coefficient group and a second boundary adjustment coefficient group. The first boundary adjustment coefficient group includes at least one coefficient. In addition, all coefficients in the first boundary adjustment coefficient group are greater than 1. The coefficient in the first boundary adjustment coefficient group may be any number greater than 1. When performing step S242-462, the data compression device 200 may select a coefficient from the preset first boundary adjustment coefficient group as the boundary adjustment coefficient $g_1^{ij}$ to enhance the amplitude of the first boundary $E_{1_b}^{ij}$. In some exemplary embodiments, when the data compression device 200 selects the boundary adjustment coefficient $g_1^{ij}$ from the preset first boundary adjustment coefficient group, the data compression device 200 may make the selection based on the boundary value of the first boundary $E_{1_b}^{ij}$. The larger the boundary value of the first boundary $E_{1_b}^{ij}$, the smaller the corresponding boundary adjustment coefficient $g_1^{ij}$. The smaller the boundary value of the first boundary $E_{1_b}^{ij}$, the larger the corresponding boundary adjustment coefficient $g_1^{ij}$.

The second boundary adjustment coefficient group includes at least one coefficient. In addition, all coefficients in the second boundary adjustment coefficient group are greater than 0 and less than 1. The coefficient in the second boundary adjustment coefficient group may be any number greater than 0 and less than 1. When performing step S242-464, the data compression device 200 may select a coefficient from the preset second boundary adjustment coefficient group as the boundary adjustment coefficient $g_1^{ij}$ to decrease the amplitude $E_{1_b}^{ij}$ of the first boundary. In some exemplary embodiments, when the data compression device 200 selects the boundary adjustment coefficient $g_1^{ij}$ from the preset second boundary adjustment coefficient group, the data compression device 200 may make the selection based on the boundary value of the first boundary $E_{1_b}^{ij}$. The larger the boundary value of the first boundary $E_{1_b}^{ij}$, the smaller the corresponding boundary adjustment coefficient $g_1^{ij}$. The smaller the boundary value of the first boundary $E_{1_b}^{ij}$, the larger the corresponding boundary adjustment coefficient $g_1^{ij}$.

In some exemplary embodiments, the data compression device 200 may further determine, by using an optimization algorithm, the boundary adjustment coefficient $g_1^{ij}$ corresponding to the current unit $P_0^{ij}$. Specifically, the data compression device 200 may establish an optimization equation. For example, the data compression device 200 may use weighted values of a distortion rate and a bit rate corresponding to the current unit $P_0^{ij}$ as optimization objects. To be specific, the optimization objects are to minimize the weighted values of the distortion rate and the bit rate corresponding to the current unit $P_0^{ij}$. Based on the optimization algorithm, iterative calculation is performed on the boundary adjustment coefficient $g_1^{ij}$ to determine the boundary adjustment coefficient $g_1^{ij}$, and the amplitude of the first boundary $E_{1_b}^{ij}$ is modulated by using the boundary adjustment coefficient $g_1^{ij}$.

As described above, in the boundary adjustment, the data compression device 200 may perform step S242-46 for each unit. After the first boundary $E_{1_b}^{ij}$ corresponding to each unit $P_0^{ij}$ is adjusted by using the boundary adjustment coefficient $g_1^{ij}$, a corresponding encoding boundary $E_{1_m}^{ij}$ is obtained. Boundary adjustment coefficients $g_1^{ij}$ corresponding to all the units are combined to constitute a boundary adjustment coefficient $g_1$. The boundary adjustment coefficients $g_1^{ij}$ corresponding to the units may be combined based on the positions of the units to generate the boundary adjustment coefficient $g_1$. The boundary adjustment coefficient $g_1$ may be considered as a matrix. It should be noted that boundary adjustment coefficients $g_1^{ij}$ corresponding to different units $P_0^{ij}$ may be the same, or may be different.

Encoding boundaries $E_{1_m}^{ij}$ corresponding to all the units are combined to constitute an encoding boundary frame $E_{1_m}$. The encoding boundaries $E_{1_m}^{ij}$ corresponding to the units may be combined based on the positions of the units to generate the encoding boundary frame $E_{1m}$. A relationship between $E_{1m}$ and $E_{1b}$ may be expressed in the following formula:

$$E_{1m}=g_1 E_{1b} \quad (3)$$

As shown in FIG. 4B and FIG. 5, when performing the boundary adjustment on the unit $P_0^{ij}$ in the ith row and the jth column, step S242-4 may include: for the current unit $P_0^{ij}$, performing the following:

S242-48. Superimpose the encoding boundary $E_{1m}^{ij}$ on the first unit $P_{1b}^{ij}$, to obtain an encoding unit $P_1^{ij}$ corresponding to the current unit $P_0^{ij}$.

After the encoding boundary $E_{1m}^{ij}$ is superimposed on the first unit $P_{1b}^{ij}$ corresponding to each unit $P_0^{ij}$, a corresponding encoding unit $P_1^{ij}$ is obtained. Encoding units $P_1^{ij}$ corresponding to all the units are combined to constitute an encoding-modulated frame $P_1$. The encoding units $P_1^{ij}$ corresponding to the units may be combined based on the positions of the units to generate the encoding-modulated frame $P_1$. A relationship between $P_1$, $E_{1m}$, and $P_{1b}$ may be expressed in the following formula:

$$P_1 = E_{1m} + P_{1b} \quad (4)$$

As can be known based on the formula (1) to the formula (4), a relationship between $P_1$ and $P_0$ may be expressed in the following formula:

$$P_1 = P_0(g_1(1-H_1(f))+H_1(f)) \quad (5)$$

For ease of description, a transfer function between $P_1$ and $P_0$ is defined as an encoding transfer function $H_E(f)$, and the encoding transfer function $H_E$ may be expressed in the following formula:

$$H_E(f)=g_1(1-H_1(f))+H_1(f) \quad (6)$$

As can be learned, because the original frame $P_0$ is divided into a plurality of units in step S242-2, the original frame $P_0$ is divided into a plurality of small regions. Therefore, different boundary adjustment coefficients $g_1^{ij}$ may be selected based on features of each unit, signal strength of the component in the intermediate-frequency to high-frequency region is adjusted more flexibly, and a better balance is achieved between the encoding effect and a bit stream size.

As shown in FIG. 4A, step S240 may further include:

S244. Encode the encoding-modulated frame $P_1$ (perform a prediction and calculate a residual) to obtain the predictive data PI and the residual data R.

S246. Input the predictive data PI and the residual data R into the bitstream generation module for combining to obtain the compressed frame.

In some exemplary embodiments, step S240 may further include:

S248. Input the encoding function $H_1^{ij}(f)$ and the boundary adjustment coefficient $g_1^{ij}$ of each unit of the original frame $P_0$ in the boundary adjustment process into the bitstream generation module for combining, to obtain the compressed frame.

In other words, the encoding function $H_1(f)$ and the boundary adjustment coefficient $g_1$ corresponding to the original frame $P_0$ are input into the bitstream generation module for combining, to obtain the compressed frame. To be specific, the compressed frame not only includes the predictive data PI and the residual data R, but also includes the encoding function $H_1^{ij}(f)$ and the boundary adjustment coefficient $g_1^{ij}$ corresponding to each of the plurality of units. The encoding function $H_1^{ij}(f)$ and the boundary adjustment coefficient $g_1^{ij}$ corresponding to each unit are the foregoing encoded data RAMI. It should be noted that the boundary adjustment coefficient $g_1$ may include a difference between the boundary adjustment coefficients $g_1^{ij}$, that is, one of the plurality of units is used as basic data, and boundary adjustment coefficients $g_1^{ij}$ corresponding to remaining units are their differences from the basic data. The boundary adjustment coefficient $g_1$ may also include a difference between the boundary adjustment coefficient $g_1^{ij}$ and a nearby boundary adjustment coefficient $g_1^{i-m,j-n}$, where both m and n are integers, and are not 0 at the same time. In this way, an amount of data in the boundary adjustment coefficient $g_1$ may be further reduced, and the compression ratio is further improved.

After the data compression device 200 performs the boundary adjustment on the original frame $P_0$, the encoding-modulated frame $P_1$ is obtained. An amplitude of a strong boundary of the encoding-modulated frame $P_1$ in the intermediate-frequency to high-frequency region is attenuated. Although an amplitude of a weak boundary of the encoding-modulated frame $P_1$ in the intermediate-frequency to high-frequency region is enhanced, after the data compression device 200 performs the boundary adjustment on the original frame $P_0$, a global amount of data information in the encoding-modulated frame $P_1$ is reduced. Then the data compression device 200 performs encoding and bitstream generation calculation on the encoding-modulated frame $P_1$. Therefore, encoding efficiency of the original frame $P_0$ can be improved, a compression ratio of the original frame is improved, and transmission efficiency of the original data is improved. In addition, as the amplitude of the weak boundary of the encoding-modulated frame $P_1$ in the intermediate-frequency to high-frequency region is enhanced, the loss of details may be avoided.

In summary, the data processing method P200 may perform the boundary adjustment on the original frame to reduce the data loss and avoid the loss of details, while improving the compression ratio of the original frame and improving the encoding efficiency and transmission efficiency of the original data.

Figure 7A:
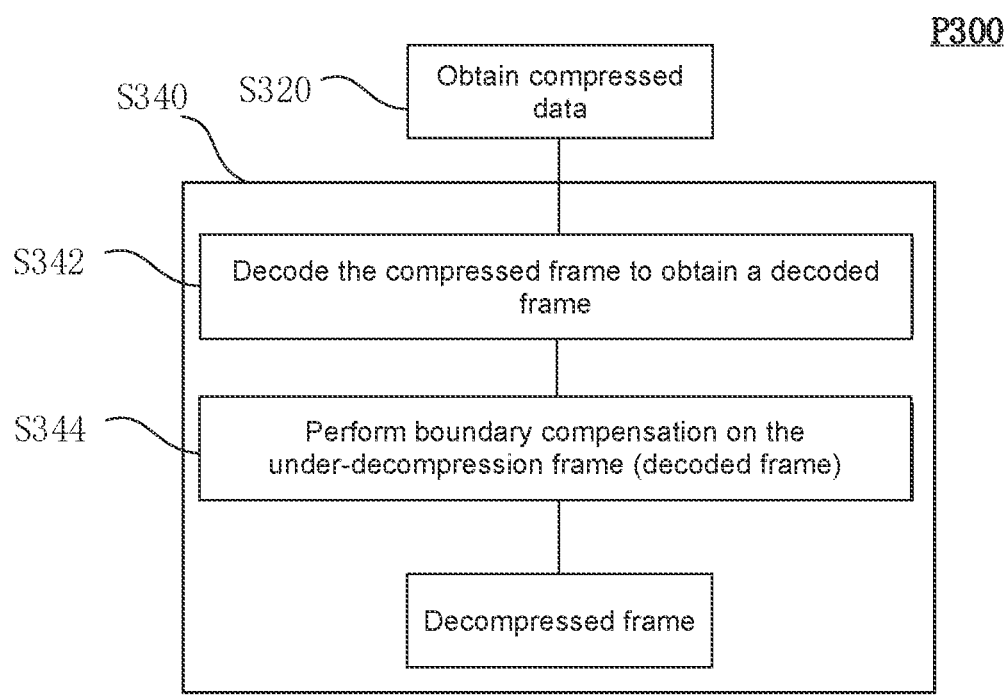
FIG. 7A is a flowchart of a data processing method for decompressing a compressed frame according to some exemplary embodiments of this disclosure.

FIG. 7A is a flowchart of the data processing method P300 for decompressing a compressed frame. As described above, the data decompression device 300 may perform the data processing method P300. Specifically, a storage medium of the data decompression device 300 may store at least one instruction set. The instruction set may be configured to instruct a decompression processor in the data decompression device 300 to implement the data processing method P300. When the data decompression device 300 operates, the decompression processor may read the instruction set and perform the data processing method P300. For ease of description, the data processing method P300 is described based on the methods shown in FIG. 3A. The method P300 may include the following steps.

S320. Obtain compressed data, where the compressed data includes the compressed frame.

The compressed data may include the compressed frame obtained by performing data compression on the original frame in the original data by using the data processing method P200. The compressed frame may include compressed predictive data PI and residual data R. In some exemplary embodiments, the compressed frame may further include an encoding function $H_1^{ij}(f)$ and a boundary adjustment coefficient $g_1^{ij}$ corresponding to each of a plurality of units in the under-compression frame, that is, an encoding function $H_1(f)$ and a boundary adjustment coefficient $g_1$, that is, the foregoing encoded data RAMI. For ease of presentation, in the following description, it is assumed that the compressed frame further includes the encoding function $H_1(f)$ and the boundary adjustment coefficient $g_1$. As shown in FIG. 3A, step S320 may include: inputting the compressed frame into the bitstream parsing module for analysis and calculation, to obtain the predictive data PI and the residual data R, and the encoding function $H_1(f)$ and the boundary adjustment coefficient $g_1$. As described above, in this disclosure, a frame is a common processing unit that makes up a data sequence. In data processing, calculation is often performed in the unit of frame. In the data processing method P200 for compressing data by the data compression device 200, the original data may be compressed in the unit of frame. When decompressing the compressed frame, the data decompression device 300 may also perform data decompression in the unit of frame.

S340. Perform data decompression on the compressed frame to obtain a decompressed frame.

The data decompression herein refers to performing decompression calculation on the compressed frame to obtain the decompressed frame, so that the original data may be restored or basically restored in the decompressed frame, or that the decompressed frame is clearer than the original data. Taking video data as an example, when an amplitude of the decompressed frame at any frequency in a low-frequency to intermediate-frequency region is restored to a threshold of the original frame or above a threshold, it would be difficult for human eyes to perceive a difference between the decompressed frame and the original frame. The threshold herein may be any value between 80% and 90%. For example, the threshold may be any value within a closed interval defined by any two values of 80%, 81%, 82%, 83%, 84%, 85%, 86%, 87%, 88%, 89%, and 90%. For example, the data decompression may enable the amplitude of the decompressed frame at any frequency in the low-frequency to intermediate-frequency region to be not less than 85%±3% of that of the original frame.

The data decompression may include performing a boundary compensation on an under-decompression frame, and decoding data that undergoes the boundary compensation, so as to obtain a required decompressed frame. The under-decompression frame, that is, a frame of data being decompressed, includes the compressed frame and any data state before the compressed frame becomes the decompressed frame during the decompression.

Taking the video data as an example, the data processing method P200 uses a combination of a boundary adjustment and encoding to compress the original frame, to further improve a compression ratio of the video data and efficiency of video transmission. In a video decompression technology, the data processing method P300 may use a combination of decoding (that is, restoring the under-compression frame based on the residual data R and the predictive data PI) and a boundary compensation to decompress the compressed frame and obtain the required decompressed frame, so as to restore data in the compressed frame. The under-decompression frame may include the compressed frame and any data state in a process of decoding the compressed frame based on the predictive data PI and the residual data R. For example, the under-decompression frame may be the compressed frame, or may be a decoded frame obtained through decoding or a predictive frame obtained through a prediction.

As described above, the data compression may include modulating the amplitude of the under-compression frame in the intermediate-frequency to high-frequency region through the boundary adjustment, for example, attenuating the amplitude in the intermediate-frequency to high-frequency region to reduce the amount of data information in the intermediate-frequency to high-frequency region, thereby reducing the amount of data information in the under-compression frame. Taking the video data as an example, since there are rich intermediate-frequency information and high-frequency information at an edge of an object in an image, yet an intermediate-frequency region and a high-frequency region carry more data, decreasing an amplitude in an intermediate-frequency to high-frequency region may visually blur boundary data of the under-compression frame, and also greatly reduce an amount of information in the image. Therefore, the data decompression may include compensating for the amplitude of the compressed frame in the intermediate-frequency to high-frequency region through the boundary compensation, for example, enhancing the amplitude in the intermediate-frequency to high-frequency region to restore it to a state of the original frame or to enhance it in comparison with a state of the original frame.

The boundary compensation applied during the data decompression of the compressed frame may be a boundary compensation performed by inputting the under-decompression frame into a boundary compensator. The boundary compensation may correspond to the boundary adjustment. In other words, a preset association relationship may exist between the boundary compensation and the boundary adjustment. Because the association relationship between the boundary compensation and the boundary adjustment is carefully set, after the boundary-adjusted compressed frame undergoes the boundary compensation and the data processing, data metrics (for example, image definition of image data) before the boundary adjustment may be fully restored or basically restored without considering potential calculation errors, or some metrics may be even better than metrics of data before the modulation (for example, the definition of a decoded image may exceed that of an original image). As described above, the encoded data RAMI (for example, the encoding function $H_1(f)$ and the boundary adjustment coefficient $g_1$) may be generated in the boundary adjustment process. That a preset association relationship may exist between the boundary compensation and the boundary adjustment may include that a preset association relationship exists between decoded data (decoding function $H_2(f)$ and boundary compensation coefficient $g_2$) in the boundary compensation. The decoded data (decoding function $H_2(f)$ and boundary compensation coefficient $g_2$), and the association relationship between the encoded data RAMI (encoding function $H_1(f)$ and boundary adjustment coefficient $g_1$) and the decoded data (decoding function $H_2(f)$ and boundary compensation coefficient $g_2$) are described in detail in the subsequent description.

Specifically, step S340 may include:

S342. Decode the compressed frame to obtain a decoded frame $P_2$.

In the method P300, the under-decompression frame may be the decoded frame $P_2$. The compressed frame may be obtained by encoding the encoding-modulated frame $P_1$ by the data compression device 200. The data decompression device 300 may decode the compressed frame to obtain the decoded frame $P_2$. That is, the data decompression device 300 obtains a predictive frame by performing a prediction based on the predictive data PI, and superimposes the residual data R on the predictive frame to obtain decoded data $P_2$, where the decoded data $P_2$ is data $P_2$ of the decoded frame. Certain errors may exist in the encoding and decoding processes. Assuming that a slight deviation is caused in the encoding and decoding processes, the decoded frame $P_2$ is basically consistent with the encoding-modulated frame $P_1$. Therefore, a relationship between $P_1$ and $P_2$ may be expressed in the following formula:

$$P_2 \approx P_1 \qquad (7)$$

S344. Perform the boundary compensation on the under-decompression frame (decoded frame $P_2$) to obtain the decompressed frame $P_4$.

Figure 7B:
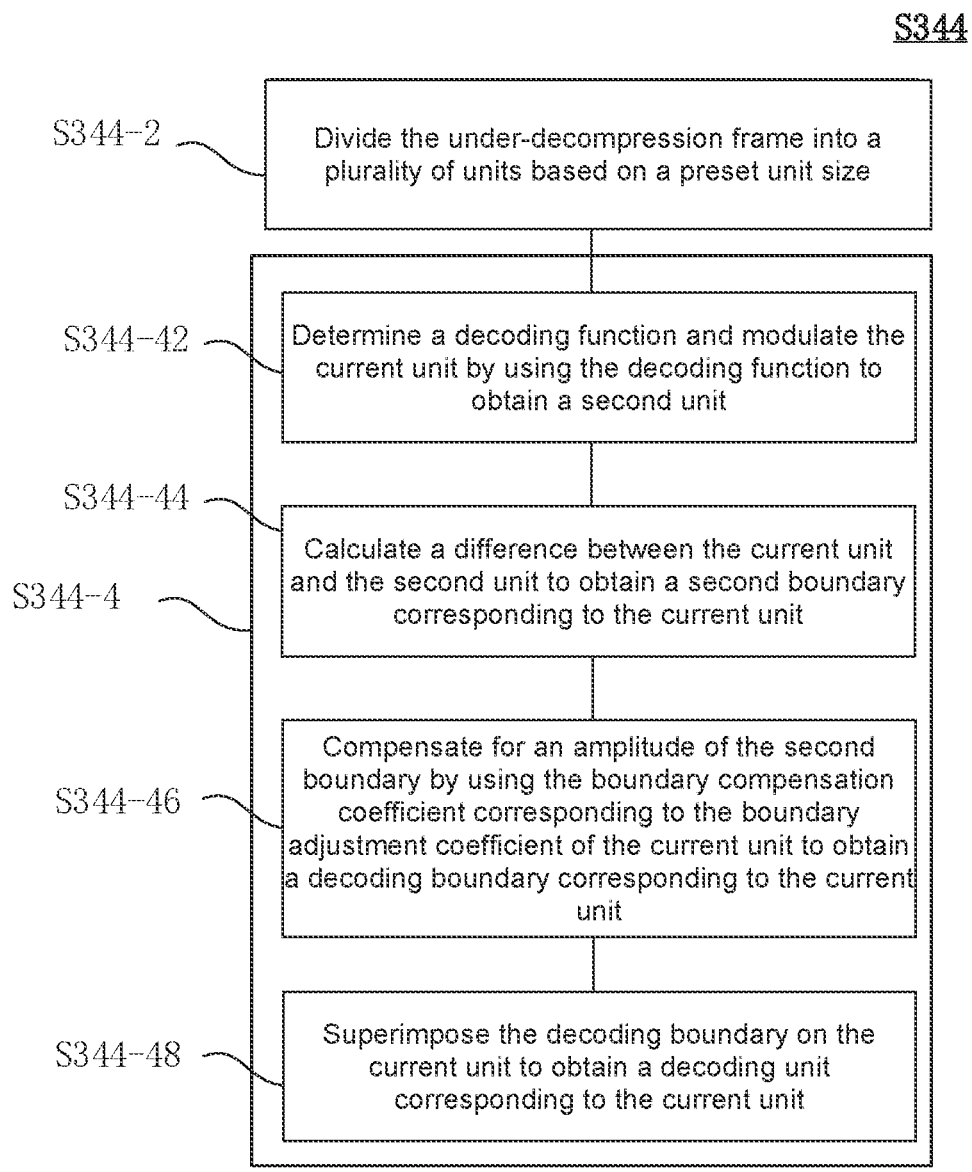
FIG. 7B is a flowchart of a boundary compensation according to some exemplary embodiments of this disclosure.
Figure 8:
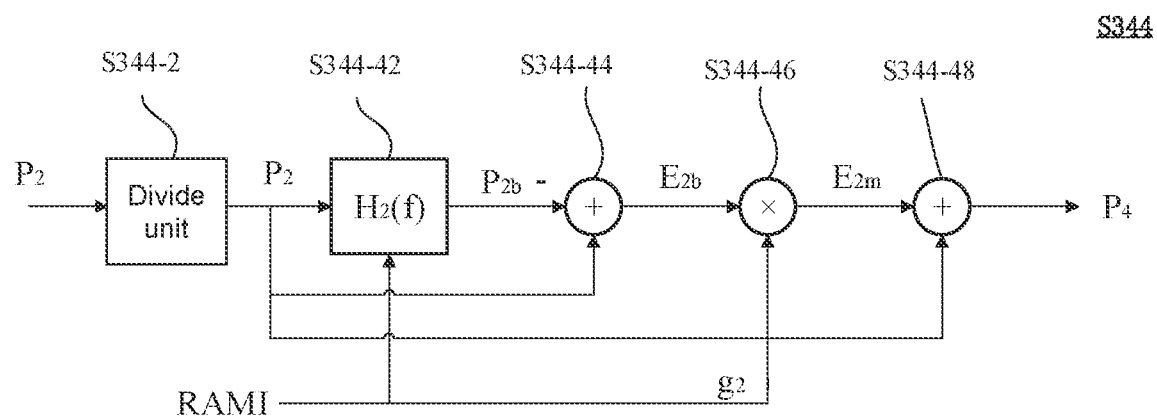
FIG. 8 is a structural flowchart of a boundary compensation according to some exemplary embodiments of this disclosure.

FIG. 7B is a flowchart of a boundary compensation according to some exemplary embodiments of this disclosure. FIG. 8 is a structural flowchart of a boundary compensation according to some exemplary embodiments of this disclosure. As shown in FIG. 7B and FIG. 8, step S344 may include the following steps performed by the at least one decompression processor of the data decompression device 300.

S344-2. Divide the under-decompression frame (decoded frame $P_2$) into the plurality of units based on the preset unit size. A manner of dividing the under-decompression frame (decoded frame $P_2$) may be consistent with a manner of dividing the under-compression frame (original frame $P_0$) in step S242-2, and a correspondence exists between the units. Details are not described again herein. For ease of description, data of a unit in an ith row and a jth column in the decoded frame $P_2$ is defined as $P_2^{ij}$.

S344-4. For each unit, compensate for the amplitude of the unit in the intermediate-frequency to high-frequency region by using a boundary compensation coefficient corresponding to the boundary adjustment coefficient.

When performing data decompression on the compressed frame, the data processing method P300 may use units in data compression as units in data decompression, and perform the boundary compensation for the amplitude of each unit in the intermediate-frequency to high-frequency region by using a boundary compensation coefficient corresponding to the boundary adjustment coefficient to compensate for the amplitude decreased in the intermediate-frequency to high-frequency region in the data compression process and obtain the decompressed frame. The boundary compensation corresponds to the boundary adjustment, and a correspondence exists between the boundary compensation coefficient and the boundary adjustment coefficient. The boundary compensation may restore definition of compressed data that undergoes the boundary adjustment to definition of the original frame, or even make the former higher than definition of the original frame. The boundary compensation may include: for each of the plurality of units in the under-decompression frame (decoded frame $P_2$), compensating for the amplitude of the unit in the intermediate-frequency to high-frequency region based on the association relationship by using the boundary compensation coefficient corresponding to the boundary adjustment coefficient. The association relationship and the boundary compensation coefficient will be described in detail in the subsequent description. When performing the boundary compensation on the unit $P_2^{ij}$ in the ith row and the jth column, step S344-4 may include: for the current unit $P_2^{ij}$, performing the following:

S344-42. Determine a decoding function $H_2^{ij}(f)$, and modulate the current unit $P_2^{ij}$ by using the decoding function $H_2^{ij}(f)$, to obtain a second unit $P_{2b}^{ij}$, so that a component of the unit in a low-frequency region in frequency domain is retained while a component of the unit in the intermediate-frequency to high-frequency region is attenuated.

$H_2^{ij}(f)$ represents the decoding function corresponding to the current unit $P_2^{ij}$ in the ith row and the jth column. In frequency domain, the decoding function $H_2^{ij}(f)$ may be a low-pass filter, to smoothly decrease the amplitude of the current unit $P_2^{ij}$ of the decoded frame $P_2$ in frequency domain, and retain the component of the current unit $P_2^{ij}$ of the decoded frame $P_2$ in the low-frequency region in frequency domain, but attenuate the component in the intermediate-frequency to high-frequency region, thereby obtaining the second unit $P_{2b}^{ij}$ corresponding to the current unit $P_2^{ij}$. To reduce an amount of calculation required in an implementation process and avoid a ringing effect, the decoding function $H_2^{ij}(f)$ should achieve a smooth transition of the amplitude of the current unit $P_2^{ij}$ in frequency domain. The decoding function $H_2^{ij}(f)$ may be any smoothly transitioned low-pass filter in any form. This is not limited in this disclosure.

It should be noted that, to avoid a ringing effect, the decoding function $H_2^{ij}(f)$ may be a smoothly transitioned curve to avoid a drastic change of the amplitude modulation gain in the curve. As described above, the ringing effect refers to that in image processing, when spectrum modulation processing is performed on one image, if the selected decoding function $H_2^{ij}(f)$ is subjected to a fast change, "ringing" occurs in the image. The "ringing" is an oscillation that accompanies a drastic grayscale change in an output image, as if an air oscillation is generated after ringing of a bell. The ringing effect often occurs at a boundary of an image.

There are a lot of boundary compensation processing methods. In a traditional technology, sometimes a high-pass filter or a band-pass filter may be used directly to filter a decoded frame $P_2$ to filter out components in a low-frequency region in the decoded frame $P_2$ and extract components in an intermediate-frequency to high-frequency region in the decoded frame $P_2$, thereby extracting boundary information. However, a lot of negative coefficients may appear among coefficients of convolution kernels corresponding to the high-pass filter and the band-pass filter. As described above, when a lot of negative coefficients appear in a convolution kernel, a significant ringing effect may occur in an image obtained by performing a convolution with the convolution kernel. Therefore, to avoid the ringing effect, the data decompression in this disclosure may perform modulation on the decoded frame $P_2$ by using a smoothly transitioned decoding function $H_2^{ij}(f)$, filters out the components in the intermediate-frequency to high-frequency region in the decoded frame $P_2$, then calculates a difference between the decoded frame $P_2$ and data modulated by using the decoding function $H_2^{ij}(f)$, to obtain the boundary information, and adjusts the boundary information with the boundary compensation coefficient, so that the boundary information may be restored to the original state or is enhanced in comparison with the original state. When the foregoing solution is used to obtain the boundary information, a decoding convolution kernel may be designed, so that all coefficients of the decoding convolution kernel are non-negative or that a ratio of an absolute value of a sum of negative coefficients to a sum of non-negative coefficients is less than 0.1. In this way, the ringing effect can be avoided.

Like the boundary adjustment, performing modulation on the current unit $P_2^{ij}$ by using the decoding function $H_2^{ij}(f)$ may also be expressed as convolving the current unit $P_{2b}^{ij}$ by using a decoding convolution kernel in a time domain. Therefore, a corresponding association relationship may exist between the decoding convolution kernel used for the boundary compensation and the encoding convolution kernel used for the boundary adjustment. In other words, a corresponding association relationship may also exist between the encoding function $H_1^{ij}(f)$ and the decoding function $H_2^{ij}(f)$. That is, by selecting the decoding function $H_2^{ij}(f)$ and the decoding convolution kernel corresponding to the encoding function $H_1^{ij}(f)$ and the encoding convolution kernel, the two methods may achieve a same effect. For ease of description, the convolution in time domain is used as an example in this disclosure to describe the boundary compensation. However, a person skilled in the art should understand that a method of spectrum modulation by multiplication by the decoding function $H_2^{ij}(f)$ in frequency domain also falls within the protection scope of this disclosure.

When the boundary compensation processing is performed on one image, if a selected decoding function has a drastic value change in a region, a higher-order convolution kernel or convolution kernel combination may be required in the implementation process. This means an increase of unnecessary calculation. In addition, a high-order convolution kernel is more likely to cause a strong color oscillation accompanying a drastic grayscale or color change in an output image, and this is referred to as the ringing effect. The ringing effect often occurs at a boundary of an image. The decoding function $H_2^{ij}(f)$ should achieve a smooth transition of the amplitude modulation gain for the current unit $P_2^{ij}$ in frequency domain, so that a drastic change of the amplitude modulation gain can be avoided. For example, when the low-frequency region is not connected to the intermediate-frequency region, the decoding function $H_2^{ij}(f)$ may modulate an amplitude of the current unit $P_2^{ij}$ in a medium-low-frequency region in frequency domain, so that a change of the amplitude modulation gain in the medium-low-frequency region becomes smooth and continuous.

To avoid the ringing effect, a ratio of an absolute value of a sum of negative coefficients to a sum of non-negative coefficients in the decoding convolution kernel may be less than a threshold. For example, the threshold may be any value of 0.01, 0.02, 0.03, 0.04, 0.05, 0.06, 0.07, 0.08, 0.09, 0.1, 0.2, 0.3, and 0.4, or any value within an interval defined by any two values thereof. For example, all convolution kernel coefficients in the decoding convolution kernel may be non-negative. An amplitude modulation gain of the decoding function $H_2^{ij}(f)$ in the intermediate-frequency to high-frequency region is equal to zero, and may fluctuate within an error range. The error range may be within an interval specified by any two values of 0, ±1%, ±2%, ±3%, ±4%, ±5%, ±6%, ±7%, ±8%, ±9%, ±10%, ±11%, ±12%, ±13%, ±14%, ±15%, ±16%, ±17%, ±18%, ±19%, ±20%, ±21%, ±22%, ±23%, ±24%, ±25%, ±26%, ±27%, ±28%, ±29%, ±30%, ±31%, ±32%, ±33%, ±34%, ±35%, and the like.

The decoding function $H_2^{ij}(f)$ may retain a direct current part, that is, an amplitude modulation gain of a part at a frequency of 0 is 1, so as to ensure that basic information in the original frame is retained. Therefore, when the decoding function $H_2^{ij}(f)$ is used to perform modulation on the current unit $P_2^{ij}$, it may achieve a smooth transition of an amplitude modulation gain from an amplitude modulation gain 1 in a position of the frequency 0 in the low-frequency region to an amplitude modulation gain approaching 0 in the intermediate-frequency region.

As described above, a corresponding association relationship should also exist between the encoding function $H_1^{ij}(f)$ and the decoding function $H_2^{ij}(f)$. In other words, the decoding function $H_2^{ij}(f)$ should correspond to the encoding function $H_1^{ij}(f)$. The storage medium of the data decompression device 300 may store a decoding function group. The decoding function group may include at least one different decoding function. Each decoding function corresponds to one decoding convolution kernel. In other words, the storage medium of the data decompression device 300 may include at least one decoding convolution kernel. In some exemplary embodiments, the storage medium of the data decompression device 300 may further store the correspondence between the decoding function $H_2^{ij}(f)$ and the encoding function $H_1^{ij}(f)$.

As described above, in some exemplary embodiments, the compressed frame includes the encoded data RAMI, that is, the encoding function $H_1(f)$ and the boundary adjustment coefficient $g_1$, that is, the encoding function $H_1^{ij}(f)$ and the boundary adjustment coefficient $g_1^{ij}$ corresponding to each unit. When convolving the current unit $P_2^{ij}$, the data decompression device 300 may select, from the preset decoding function group based on the encoding function $H_1(f)$ and the correspondence between the decoding function $H_2^{ij}(f)$ and the encoding function $H_1^{ij}(f)$, a function corresponding to the encoding function $H_1^{ij}(f)$ of the current unit $P_2^{ij}$ as the decoding function $H_2^{ij}(f)$ corresponding to the current unit $P_2^{ij}$; and select, from the at least one decoding convolution kernel, a convolution kernel corresponding to the decoding function $H_2^{ij}(f)$ corresponding to the current unit $P_2^{ij}$ as the decoding convolution kernel to convolve the current unit $P_2^{ij}$.

In some exemplary embodiments, the compressed frame may not include the encoded data RAMI, that is, the encoding function $H_1(f)$ and the boundary adjustment coefficient $g_1$. In this case, when convolving the current unit $P_2^{ij}$, the data decompression device 300 may select any function from the preset decoding function group as the decoding function $H_2^{ij}(f)$, and use a convolution kernel corresponding to the function as the decoding convolution kernel to convolve the current unit $P_2^{ij}$. The data decompression device 300 may also select the decoding function $H_2^{ij}(f)$ from the decoding function group based on experience, for example, select the decoding function $H_2^{ij}(f)$ by machine learning.

In some exemplary embodiments, the decoding function $H_2^{ij}(f)$ may be the same as the encoding function $H_1^{ij}(f)$. The curve shown in FIG. 6 may also be a curve of the decoding function $H_2^{ij}(f)$. A person skilled in the art should understand that all decoding functions $H_2^{ij}(f)$ that can smoothly decrease an amplitude of the current unit $P_2^{ij}$ in frequency domain and retain a component of the current unit $P_2^{ij}$ of the decoded frame $P_2$ in the low-frequency region in frequency domain while attenuating a component in the intermediate-frequency to high-frequency region, and a linear combination $H_2^{ij}(f)=\Sigma_{m=1}^{n} k_m H_{2m}^{ij}(f)$ of decoding functions $H_2^{ij}(f)$, or a product combination $H_2^{ij}(f)=\Pi_{q=1}^{n} k_q H_{2q}^{ij}(f)$ of decoding functions $H_2^{ij}(f)$, or a combination of a linear combination and a product combination shall fall within the protection scope of this disclosure, where m≥1, $H_2^{ij}(f)=\Sigma_{m=1}^{n} k_m H_{2m}^{ij}(f)$ represents a linear combination of n functions, $H_{2m}^{ij}(f)$ represents an mth function, $k_m$ represents a weight corresponding to the mth function, q≥1, $H_2^{ij}(f)=\Pi_{q=1}^{n} k_q H_{2q}^{ij}(f)$ represents a product combination of the n functions, $k_q$ represents a weight corresponding to a qth function, and $H_{2q}^{ij}(f)$ may be any function.

As described above, in the boundary compensation, the data decompression device 300 may perform step S344-42 for each unit. After each unit $P_2^{ij}$ is modulated by the decoding function $H_2^{ij}(f)$, a corresponding second unit $P_{2b}^{ij}$ is obtained. Decoding functions $H_2^{ij}(f)$ corresponding to all the units are combined to constitute the decoding function $H_2(f)$. The decoding functions $H_2^{ij}(f)$ corresponding to the units may be combined based on the positions of the units to generate the decoding function $H_2(f)$. The decoding function $H_2(f)$ may be considered as a matrix.

Second units $P_{2b}{}^{ij}$ corresponding to all the units are combined to constitute a second frame $P_{2b}$. The second units $P_{2b}{}^{ij}$ corresponding to the units may be combined based on the positions of the units to generate the second frame $P_{2b}$. The second frame $P_{2b}$ is a blurred image. A relationship between $P_2$ and $P_{2b}$ may be expressed in the following formula:

$$P_{2b}=P_2H_2(f) \quad (8)$$

As shown in FIG. 7B and FIG. 8, when performing the boundary compensation on the unit $P_2{}^{ij}$ in the ith row and the jth column, step S344-4 may further include: for the current unit $P_2{}^{ij}$, performing the following:

S344-44. Calculate a difference between the current unit $P_2{}^{ij}$ and the second unit $P_{2b}{}^{ij}$, to obtain a second boundary $E_{2b}{}^{ij}$ corresponding to the current unit $P_2{}^{ij}$.

Intermediate-frequency to high-frequency components in a spectrum of each frame of data are mainly centralized in a region in which data changes dramatically in the frame of data, that is, boundary data of the data. For example, for a frame image, intermediate-frequency to high-frequency data is mainly centralized in a boundary of an object in the image, that is, boundary data of the frame image. The decoding function $H_2{}^{ij}(f)$ may smoothly decrease the amplitude of the current unit $P_2{}^{ij}$ in frequency domain to attenuate the component in the intermediate-frequency to high-frequency region. Therefore, the second unit $P_{2b}{}^{ij}$ may be understood as data excluding boundary information of the current unit $P_2{}^{ij}$. Then a boundary of the current unit $P_2{}^{ij}$, that is, the second boundary $E_{2b}{}^{ij}$ may be obtained by calculating the difference between the current unit $P_2{}^{ij}$ and the second unit $P_{2b}{}^{ij}$. Therefore, the second boundary $E_{2b}{}^{ij}$ includes the component of the current unit $P_2{}^{ij}$ in the intermediate-frequency to high-frequency region. The second boundary $E_{2b}{}^{ij}$ includes the boundary information of the current unit $P_2{}^{ij}$. After each unit $P_2{}^{ij}$ undergoes step S344-44, a corresponding second boundary $E_{2b}{}^{ij}$ may be obtained. Second boundaries $E_{2b}{}^{ij}$ corresponding to all the units are combined to constitute a second boundary frame $E_{2b}{}^{ij}$. The second boundaries $E_{2b}{}^{ij}$ corresponding to the units may be combined based on the positions of the units to generate the second boundary frame $E_{2b}$. The second boundary frame $E_{2b}$ may be expressed in the following formula:

$$E_{2b}=P_2-P_{2b}=P_2-P_2H_2(f) \quad (9)$$

As shown in FIG. 7B and FIG. 8, when performing the boundary compensation on the unit $P_2{}^{ij}$ in the ith row and the jth column, step S344-4 may further include: for the current unit $P_2{}^{ij}$, performing the following:

S344-46. Compensate for an amplitude of the second boundary $E_{2b}{}^{ij}$ by using the boundary compensation coefficient corresponding to the boundary adjustment coefficient $g_1{}^{ij}$ of the current unit $P_2{}^{ij}$, to obtain a decoding boundary $E_{2m}{}^{ij}$ corresponding to the current unit $P_2{}^{ij}$.

For ease of description, the boundary compensation coefficient corresponding to the boundary compensation is defined as $g_2$. A boundary compensation coefficient corresponding to the unit $P_2{}^{ij}$ in the ith row and the jth column is defined as $g_2{}^{ij}$. As described above, the boundary adjustment may attenuate an amplitude of a strong boundary of the under-compression frame in the intermediate-frequency to high-frequency region in frequency domain, to blur boundary data of the under-compression frame, so that an amount of data generated by encoding is reduced. The boundary compensation may restore or even enhance the data that undergoes the boundary adjustment. In other words, the boundary compensation may fully restore or basically restore an amplitude of the under-decompression frame in the intermediate-frequency to high-frequency region to a state before the attenuation or even enhance an amplitude in comparison with a state before the attenuation. In other words, the preset association relationship exists between the boundary adjustment coefficient $g_1{}^{ij}$ and the boundary compensation coefficient $g_2{}^{ij}$, that is, the boundary adjustment coefficient $g_1{}^{ij}$ corresponds to the boundary compensation coefficient $g_2{}^{ij}$. The storage medium of the data decompression device 300 may store a boundary compensation coefficient group. The boundary compensation coefficient group may include at least one different coefficient. In some exemplary embodiments, the storage medium of the data decompression device 300 may further store the correspondence between the boundary adjustment coefficient $g_1{}^{ij}$ and the boundary compensation coefficient $g_2{}^{ij}$.

As described above, in some exemplary embodiments, the compressed frame includes the encoded data RAMI, that is, the encoding function $H_1(f)$ and the boundary adjustment coefficient $g_1$, that is, the encoding function $H_1{}^{ij}(f)$ and the boundary adjustment coefficient $g_2{}^{ij}$ corresponding to each unit. When performing step S344-46, the data decompression device 300 may select, from the preset boundary compensation coefficient group based on the association relationship between the boundary adjustment coefficient $g_1{}^{ij}$ and the boundary compensation coefficient $g_2{}^{ij}$, the boundary compensation coefficient $g_1{}^{ij}$ corresponding to the boundary adjustment coefficient $g_1{}^{ij}$ of the current unit $P_2{}^{ij}$ as the boundary compensation coefficient $g_2{}^{ij}$ corresponding to the current unit $P_2{}^{ij}$ to compensate for the amplitude of the second boundary $E_{2b}{}^{ij}$.

In some exemplary embodiments, the compressed frame does not include the encoded data RAMI, that is, the encoding function $H_1(f)$ and the boundary adjustment coefficient $g_1$. In this case, when performing step S344-46, the data decompression device 300 may select any coefficient from the preset boundary compensation coefficient group as the boundary compensation coefficient $g_2{}^{ij}$ corresponding to the current unit $P_2{}^{ij}$ to compensate for the amplitude of the second boundary $E_{2b}{}^{ij}$. The data decompression device 300 may also select the boundary compensation coefficient $g_2{}^{ij}$ from the boundary compensation coefficient group based on experience; for example, select the boundary compensation coefficient $g_2{}^{ij}$ by machine learning.

The decoding boundaries $E_{2m}{}^{ij}$ corresponding to all the units are combined to constitute a decoding boundary frame $E_{2m}$. The decoding boundaries $E_{2m}{}^{ij}$ corresponding to the units may be combined based on the positions of the units to generate the decoding boundary frame $E_{2m}$. A relationship between $E_{2m}$ and $E_{2b}$ may be expressed in the following formula:

$$E_{2m}=g_2E_{2b} \quad (10)$$

As shown in FIG. 7B and FIG. 8, when performing the boundary compensation on the unit $P_0{}^{ij}$ in the ith row and the jth column, step S344-4 may further include: for the current unit $P_2{}^{ij}$, performing the following:

S344-48. Superimpose the decoding boundary $E_{2m}{}^{ij}$ on the current unit $P_2{}^{ij}$, to obtain a decoding unit $P_4{}^{ij}$ corresponding to the current unit $P_2{}^{ij}$.

After the decoding boundary $E_{2m}{}^{ij}$ is superimposed on each unit $P_2{}^{ij}$, a corresponding decoding unit $P_4{}^{ij}$ is obtained. Decoding units $P_4{}^{ij}$ corresponding to all the units are combined to constitute the decompressed frame $P_4$. The decoding units $P_4{}^{ij}$ corresponding to the units may be combined based on the positions of the units to generate the decompressed frame $P_4$. A relationship between $P_4$, $E_{2m}$, and $P_2$ may be expressed in the following formula:

$$P_4 = E_{2m} + P_2 \quad (11)$$

As can be known based on the formula (8) to the formula (11), a relationship between $P_2$ and $P_4$ may be expressed in the following formula:

$$P_4 = P_2(g_2(1-H_2(f))+1) \quad (12)$$

For ease of description, a transfer function between $P_4$ and $P_2$ is defined as a decoding transfer function $H_D(f)$, and the decoding transfer function $H_D$ may be expressed in the following formula:

$$H_D(f) = g_2(1-H_2(f))+1 \quad (13)$$

As can be known based on the formulas (5), (6), (12), and (13), a relationship between $P_0$ and $P_4$ may be expressed in the following formula:

$$P_4 = P_2 H_D(f) \approx P_0 H_D(f) H_E(f) \quad (14)$$

Taking the video data as an example, human eyes are relatively sensitive to information in the low-frequency to intermediate-frequency region, but the boundary adjustment is designed only to attenuate the amplitude of the original frame $P_0$ in the intermediate-frequency to high-frequency region, while the encoding-modulated frame $P_1$ is allowed to retain frequency information of a low frequency in the original frame $P_0$. Therefore, the decoded frame $P_2$ is basically consistent with the encoding-modulated frame $P_1$, and the decoded frame $P_2$ also retains the frequency information of the low frequency. The boundary compensation is also designed only to compensate for the amplitude of the decoded frame $P_2$ in the intermediate-frequency to high-frequency region. Therefore, the decoded frame $P_4$ retains the frequency information of the low frequency in the original frame $P_0$. Therefore, theoretically, without considering a deviation caused by other algorithms, all frequency information of an intermediate frequency in the original frame $P_0$ can be fully restored or basically restored in the decompressed frame $P_4$ obtained from the boundary compensation by compensating for the amplitude of the decoded frame $P_2$ in the intermediate-frequency to high-frequency region. In other words, the data decompression may restore or even enhance the data that undergoes the data compression at any intermediate frequency. Therefore, after the data decompression, the amplitude of the decompressed frame $P_4$ at any frequency in the low-frequency region should be approximately equal to that of the original frame $P_0$, and the amplitude of the decompressed frame $P_4$ at any frequency in the intermediate-frequency region should be approximately equal to or greater than that of the original frame $P_0$. Being approximately equal means that the amplitude of the decompressed frame $P_4$ is equal to the amplitude of the original frame $P_0$ and fluctuates within an error range. Taking the video data as an example, when the amplitude of the decompressed frame $P_4$ at any frequency in the low-frequency to intermediate-frequency region is restored to 85% or above 85% of that of the original frame $P_0$, it is difficult for human eyes to perceive a difference between the decompressed frame $P_4$ and the original frame $P_0$. Therefore, after the data decompression, the amplitude of the decompressed frame $P_4$ at any frequency in the low-frequency to intermediate-frequency region may not be less than 85% of that of the original frame $P_0$. That is, the error range may not cause the amplitude of the decompressed frame $P_4$ at any frequency in the low-frequency to intermediate-frequency region to be less than 85% of that of the original frame $P_0$.

Because human eyes are relatively not sensitive to information in the high-frequency region, the information in the high-frequency region may be retained in the decompressed frame $P_4$ to adapt to a scenario requiring high quality, or may be attenuated to suppress unnecessary high-frequency noise. In other words, an amplitude of the decompressed frame $P_4$ at any frequency in the high-frequency region should be approximately equal to that of the original frame $P_0$, or may be less than that of the original frame $P_0$, or may be greater than that of the original frame $P_0$. A relationship between $P_0$ and $P_4$ may be expressed in the following formula:

$$\left\{ \begin{array}{l} P_4 \geq P_0, (f \leq f_0) \\ P_4 < P_0, (f > f_0) \end{array} \right\} \text{ or} \quad (15)$$

$$\left\{ \begin{array}{l} P_4 \geq P_0, (f \leq f_0) \\ P_4 \geq P_0, (f > f_0) \end{array} \right\} \quad (16)$$

It should be noted that an error range may be allowed in the formula. For example, for $P_4 \geq P_0$, in a case in which a basic value of $P_4$ is greater than or equal to $P_0$, $P_4$ may be allowed to fluctuate within an error range. That is, when $P_4 = P_0$, in a case in which $P_4$ has a negative error, $P_4$ may be allowed to be slightly less than $P_0$. Herein, only a basic relationship between $P_4$ and $P_0$ is illustrated in the formula, but no error is included into the formula. A person skilled in the art should know that a case in which the amplitude of the decompressed frame $P_4$ in the low-frequency to intermediate-frequency region is slightly less than that of the original frame $P_0$ due to a fluctuation within an error range also falls within the protection scope of this disclosure. In the following formulas, errors within an error range are also allowed. The following also provides only a description about the basic relationship that the amplitude of $P_4$ is greater than or equal to the amplitude of the original frame $P_0$. Fluctuations within the error range may be obtained by a person skilled in the art.

For ease of description, a global spectrum modulation function between $P_0$ and $P_4$ is defined as $H_0(f)$. In this case, the relationship between $P_0$ and $P_4$ may be expressed in the following formula:

$$P_4 = H_0(f) P_0 \quad (17)$$

In this case, the global spectrum modulation function $H_0(f)$ may be expressed in the following formula:

$$\left\{ \begin{array}{l} H_0(f) = H_D(f) H_E(f) = \\ (g_1(1-H_1(f)) + H_1(f))(g_2(1-H_2(f))+1) \geq 1, (f \leq f_0) \\ H_0(f) = H_D(f) H_E(f) = \\ (g_1(1-H_1(f)) + H_1(f))(g_2(1-H_2(f))+1) < 1, (f > f_0) \end{array} \right\} \quad (18)$$

or $$\left\{ \begin{array}{l} H_0(f) = H_D(f) H_E(f) = \\ (g_1(1-H_1(f)) + H_1(f))(g_2(1-H_2(f))+1) \geq 1, (f \leq f_0) \\ H_0(f) = H_D(f) H_E(f) = \\ (g_1(1-H_1(f)) + H_1(f))(g_2(1-H_2(f))+1) \geq 1, (f > f_0) \end{array} \right\} \quad (19)$$

In the formula, $f0$ is a boundary value of a frequency to which human eyes are sensitive. For the video data, $f0$ may be 0.33 or other values larger or smaller than 0.33. For different types of data, a value of $f0$ may be different.

For $H_0(f)$ in the foregoing formulas (18) and (19), when $H_0(f)$ in a selected frequency domain interval is approximately equal to 1, data of the decompressed frame $P_4$ in the selected frequency domain interval may be restored to data of the original frame $P_0$; or when $H_0(f)$ in a selected frequency domain interval is greater than 1, data of the decompressed frame $P_4$ in the selected frequency domain interval may be enhanced, that is, an amplitude of the decompressed frame $P_4$ in the selected region is greater than that of the original frame $P_0$. For example, if the original frame $P_0$ is one frame in a video, as long as $H_0(f)$ in the selected frequency domain interval is caused to be greater than 1, definition can be enhanced. For ease of description, $H_0(f) \approx 1$ is defined as a normal mode, and $H_0(f) > 1$ is defined as an enhanced mode. The following describes the global spectrum modulation function $H_0(f)$ in detail by using the video data as an example.

Figure 9A:
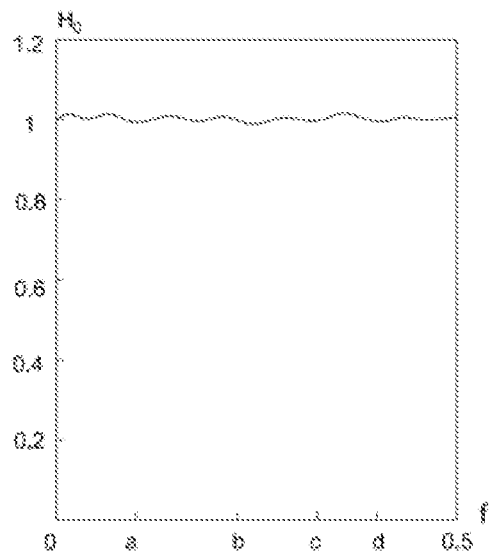
FIG. 9A is a graph of a global modulation function $H_0(f)$ according to some exemplary embodiments of this disclosure.
Figure 9B:
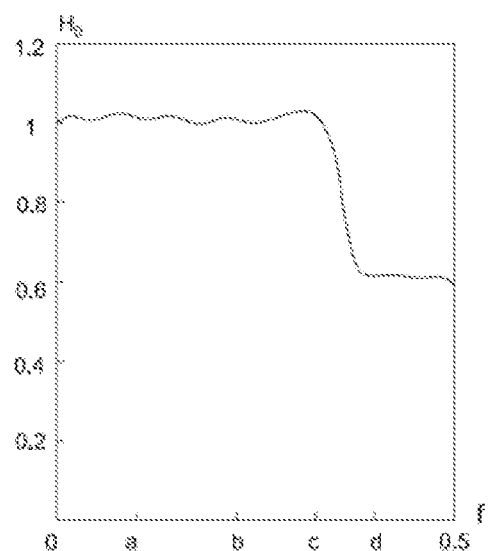
FIG. 9B is a graph of a global modulation function $H_0(f)$ according to some exemplary embodiments of this disclosure.
Figure 9C:
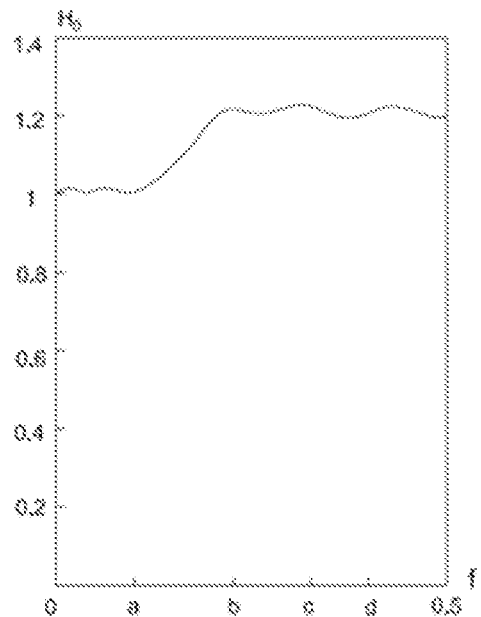
FIG. 9C is a graph of a global modulation function $H_0(f)$ according to some exemplary embodiments of this disclosure.
Figure 9D:
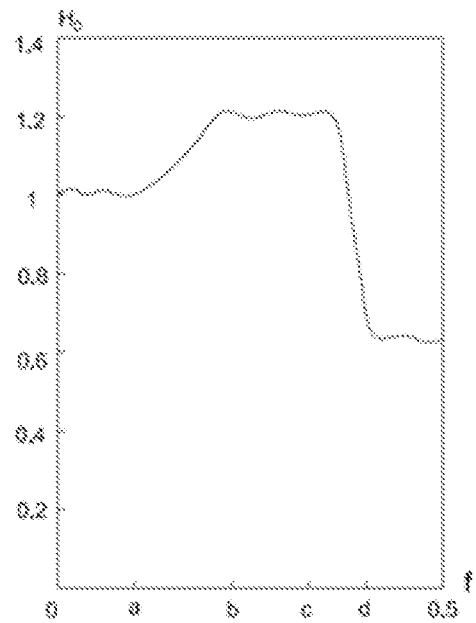
FIG. 9D is a graph of a global modulation function $H_0(f)$ according to some exemplary embodiments of this disclosure.

FIG. 9A is a graph of a global modulation function $H_0(f)$ according to some exemplary embodiments of this disclosure. FIG. 9B is a graph of a global modulation function $H_0(f)$ according to some exemplary embodiments of this disclosure. FIG. 9C is a graph of a global modulation function $H_0(f)$ according to some exemplary embodiments of this disclosure. FIG. 9D is a graph of a global modulation function $H_0(f)$ according to some exemplary embodiments of this disclosure. As shown in FIG. 9A to FIG. 9D, a horizontal axis is a normalized frequency $f$; and a vertical axis is an amplitude modulation gain $H_0$ of the global spectrum modulation function $H_0(f)$. Curves in FIG. 9A to FIG. 9D represent different global spectrum modulation functions $H_0(f)$. A maximum value of the normalized frequency on the horizontal axis may be 0.5. The normalized frequency $f$ on the horizontal axis may be divided into a low-frequency region, a medium-low-frequency region, an intermediate-frequency region, a medium-high-frequency region, and a high-frequency region. Frequencies within (0, a] are low frequencies; frequencies within (a, b] are medium-low frequencies; frequencies within (b, c] are intermediate frequencies; frequencies within (c, d] are medium-high frequencies; and frequencies within (d, 0.5] are high frequencies. For values of a, b, c, d, and e, reference may be made to FIG. 6, and details are not described again herein.

Since human eyes are more sensitive to data in the low-frequency to intermediate-frequency region than data in the high-frequency region in the video data, after the data decompression, the information in the low-frequency to intermediate-frequency region in the decompressed frame $P_4$ relative to the original frame $P_0$ may be retained as much as possible without loss. In other words, the global spectrum modulation function $H_0(f)$ may cause the amplitude of the decompressed frame $P_4$ in the low-frequency to intermediate-frequency region not to be less than 85% of that of the original frame $P_0$, or may even enable the former to be greater than that of the original frame $P_0$. Because human eyes are insensitive to the information in the high-frequency region, the amplitude of the decompressed frame $P_4$ in the high-frequency region may be selected according to different application scenarios. For example, in a scenario requiring low definition, the amplitude of the decompressed frame $P_4$ in the high-frequency region may be less than that of the original frame $P_0$. In a reconnaissance scenario requiring high definition, the amplitude of the decompressed frame $P_4$ in the high-frequency region may be approximately equal to or greater than that of the original frame $P_0$. As shown in FIG. 9A to FIG. 9D, an amplitude modulation gain $H_0$ of the global modulation function $H_0(f)$ at any frequency $f$ in the low-frequency to intermediate-frequency region (including the low-frequency region and intermediate-frequency region) is greater than 1 or approximately equal to 1, so that the amplitude of the decompressed frame $P_4$ after the decompression is not less than 85% of that of the original frame $P_0$ or that definition is restored or enhanced, thereby enhancing a visual observation effect. Being approximately equal to 1 herein may be fluctuating within an error range around 1. The error range may be within an interval specified by any two values of 0, ±1%, ±2%, ±3%, ±4%, ±5%, ±6%, ±7%, ±8%, ±9%, ±10%, ±11%, ±12%, ±13%, ±14%, ±15%, and the like. For ease of description, an amplitude modulation gain of the global modulation function $H_0(f)$ in the high-frequency region is defined as a first amplitude modulation gain, an amplitude modulation gain in the intermediate-frequency region is defined as a second amplitude modulation gain, and an amplitude modulation gain in the low-frequency region is defined as a third amplitude modulation gain. The third amplitude modulation gain value, the second amplitude modulation gain value, and the first amplitude modulation gain value may fluctuate within the error range.

As shown in FIG. 9A, the third amplitude modulation gain value, the second amplitude modulation gain value, and the first amplitude modulation gain value of the global modulation function $H_0(f)$ in the low-frequency to high-frequency region are all approximately equal to 1, so that none of amplitudes of the decompressed frame $P_4$ in the low-frequency to high-frequency region is less than that of 85% of the original frame $P_0$ and that data of the decompressed frame $P_4$ in the low-frequency to high-frequency region may be smoothly restored or basically restored to a state of the original frame $P_0$.

As shown in FIG. 9B, the third amplitude modulation gain value and the second amplitude modulation gain value of the global modulation function $H_0(f)$ in the low-frequency to intermediate-frequency region are approximately equal to 1, so that data of the decompressed frame $P_4$ in the low-frequency to intermediate-frequency region can be smoothly restored or basically restored to a state of the original frame $P_0$. The first amplitude modulation gain value of the global modulation function $H_0(f)$ in the high-frequency region is less than 1, so that the amplitude of the decompressed frame $P_4$ in the high-frequency region may be smoothly decreased in comparison with that of the original frame $P_0$, to suppress high-frequency noise. The smooth decrease of the amplitude may include that the amplitude is attenuated by the first amplitude modulation gain value, or that the amplitude is attenuated within an error range around the first amplitude modulation gain value. For example, the first amplitude modulation gain may be any value between 0 and 1. For example, the first amplitude modulation gain value may be within an interval specified by any two values of 0, 0.04, 0.08, 0.12, 0.16, 0.20, 0.24, 0.28, 0.32, 0.36, 0.40, 0.44, 0.48, 0.52, 0.56, 0.60, 0.64, 0.68, 0.72, 0.76, 0.80, 0.84, 0.88, 0.92, 0.96, and 1. As shown in FIG. 9B, the first amplitude modulation gain of the global modulation function $H_0(f)$ in the high-frequency region (probably within an interval of 0.4 to 0.5) is around 0.6. Both the second and third amplitude modulation gain values are around 1. The second and third amplitude modulation gain values may fluctuate within an error range. For example, the second and third amplitude modulation gain values may be within an interval specified by any two values of 0.85, 0.90, 0.95, 1, 1.05, 1.10, and 1.15.

As shown in FIG. 9C, the third amplitude modulation gain value of the global modulation function $H_0(f)$ in the low-frequency region is approximately equal to 1, so that data of the decompressed frame $P_4$ in the low-frequency region can be smoothly restored or basically restored to a state of the original frame $P_0$. Both the second amplitude modulation gain value of the global modulation function $H_0(f)$ in the intermediate-frequency region and the first amplitude modulation gain value in the high-frequency region may be greater than 1, so that the amplitude of the decompressed frame $P_4$ in the intermediate-frequency to high-frequency region is smoothly increased in comparison with that of the original frame $P_0$ and that definition of the data in the intermediate-frequency to high-frequency region is enhanced. The smooth increase of the amplitude may include that the amplitude is enhanced by the second amplitude modulation gain value and the first amplitude modulation gain value, or may include that the amplitude is enhanced within an error range around the second amplitude modulation gain value and the first amplitude modulation gain value. The second amplitude modulation gain value and the first amplitude modulation gain value may be approximately consistent, or the second amplitude modulation gain value may be greater than the first amplitude modulation gain value, or the second amplitude modulation gain value may be less than the first amplitude modulation gain value. In the curve shown in FIG. 9C, the second amplitude modulation gain value and the first amplitude modulation gain value are approximately consistent. The second amplitude modulation gain value and the first amplitude modulation gain value may be any values greater than 1. For example, the second amplitude modulation gain value and the first amplitude modulation gain value may be within an interval specified by any two values of 1, 1.1, 1.2, 1.3, 1.4, 1.5, 1.6, 1.7, 1.8, 1.9, 2, 2.1, 2.2, and 2.4. As shown in FIG. 9C, the second amplitude modulation gain and the first amplitude modulation gain of the global modulation function $H_0(f)$ in the intermediate-frequency to high-frequency region are around 1.2.

As shown in FIG. 9D, the third amplitude modulation gain value of the global modulation function $H_0(f)$ in the low-frequency region is approximately equal to 1, so that data of the decompressed frame $P_4$ in the low-frequency region can be smoothly restored or basically restored to a state of the original frame $P_0$. The second amplitude modulation gain value of the global modulation function $H_0(f)$ in the intermediate-frequency region is greater than 1, so that the amplitude of the decompressed frame $P_4$ in the intermediate-frequency region is smoothly increased in comparison with that of the original frame $P_0$ and that definition of the data in the intermediate-frequency region is enhanced. The first amplitude modulation gain value of the global modulation function $H_0(f)$ in the high-frequency region is less than 1, so that the amplitude of the decompressed frame $P_4$ in the high-frequency region is smoothly decreased in comparison with that of the original frame $P_0$ and that an amount of data in the insensitive high-frequency region is reduced, to suppress high-frequency noise. The curve shown in FIG. 9D can enhance definition while reducing the amount of data. The second amplitude modulation gain value may be any value greater than 1. The first amplitude modulation gain may be any value between 0 and 1. As shown in FIG. 9D, the second amplitude modulation gain of the global modulation function $H_0(f)$ in the intermediate-frequency region is around 1.2, and the first amplitude modulation gain in the high-frequency region is around 0.6.

Further, when the high-frequency region is not connected to the intermediate-frequency region, the global spectrum modulation function $H_0(f)$ may further modulate the amplitude in the high-frequency region, so that a change of an amplitude modulation gain in the medium-high-frequency region is smooth and continuous.

Further, when the intermediate-frequency region is not connected to the low-frequency region, the global spectrum modulation function $H_0(f)$ may further modulate an amplitude in the medium-low-frequency region, so that a change of an amplitude modulation gain in the medium-low-frequency region is continuous.

The curve of the global modulation function $H_0(f)$ may be a smoothly transitioned curve. In engineering implementation, on a basis that the amplitude of the decompressed frame $P_4$ in the low-frequency to intermediate-frequency region is approximately equal to or greater than that of the original frame $P_0$, the curve of the global modulation function $P_4$ may be allowed to fluctuate within a small range, and the fluctuation has no impact on a decompression effect. For other forms of data than the video data, parameters of the global modulation function $H_0(f)$ may be set according to a receiver's sensitivity to the data. For different forms of data, the receiver's sensitivity to frequencies may also be different.

For ease of presentation, the case shown in the formula (18) is used as an example for description. With reference to the formula (17) and the formula (18), the decompressed frame $P_4$ may be expressed in the following formula:

$$\begin{cases} P_4 \approx P_0(g_1(1-H_1(f)) + H_1(f))(g_2(1-H_2(f)) + 1) \geq P_0, \ (f \leq f_0) \\ P_4 \approx P_0(g_1(1-H_1(f)) + H_1(f))(g_2(1-H_2(f)) + 1) \geq P_0, \ (f > f_0) \end{cases} \quad (20)$$

Figure 10A:
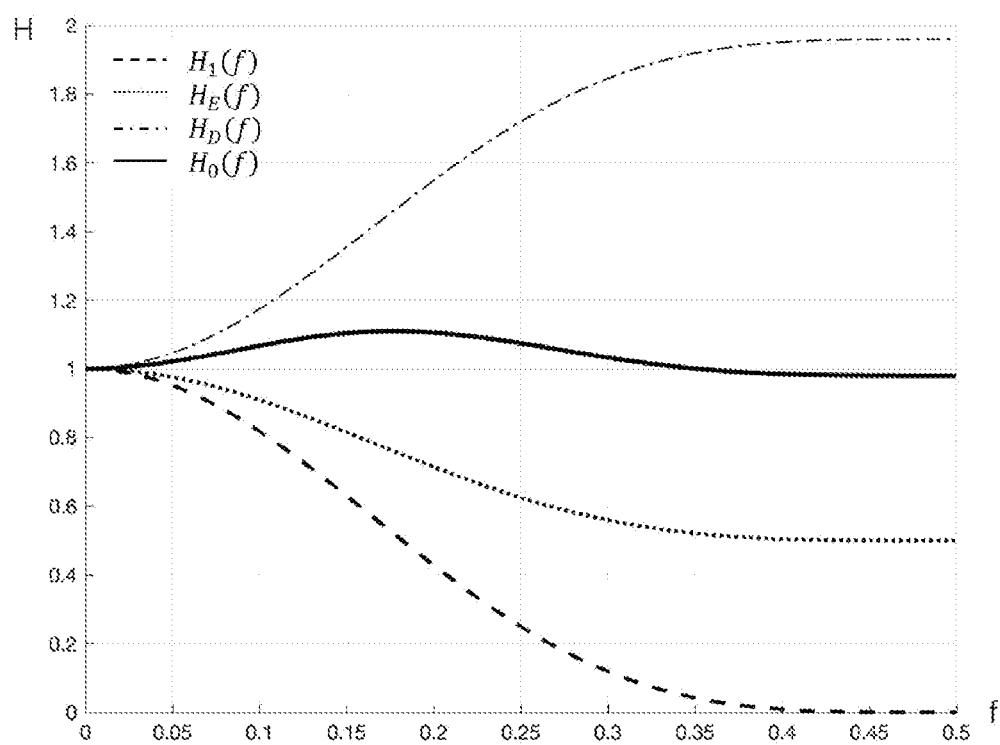
FIG. 10A is a graph showing curves of a global modulation function $H_0(f)$, a boundary adjustment function $H_1(f)$, and a decoding function $H_2(f)$ in normal mode according to some exemplary embodiments of this disclosure.
Figure 10:
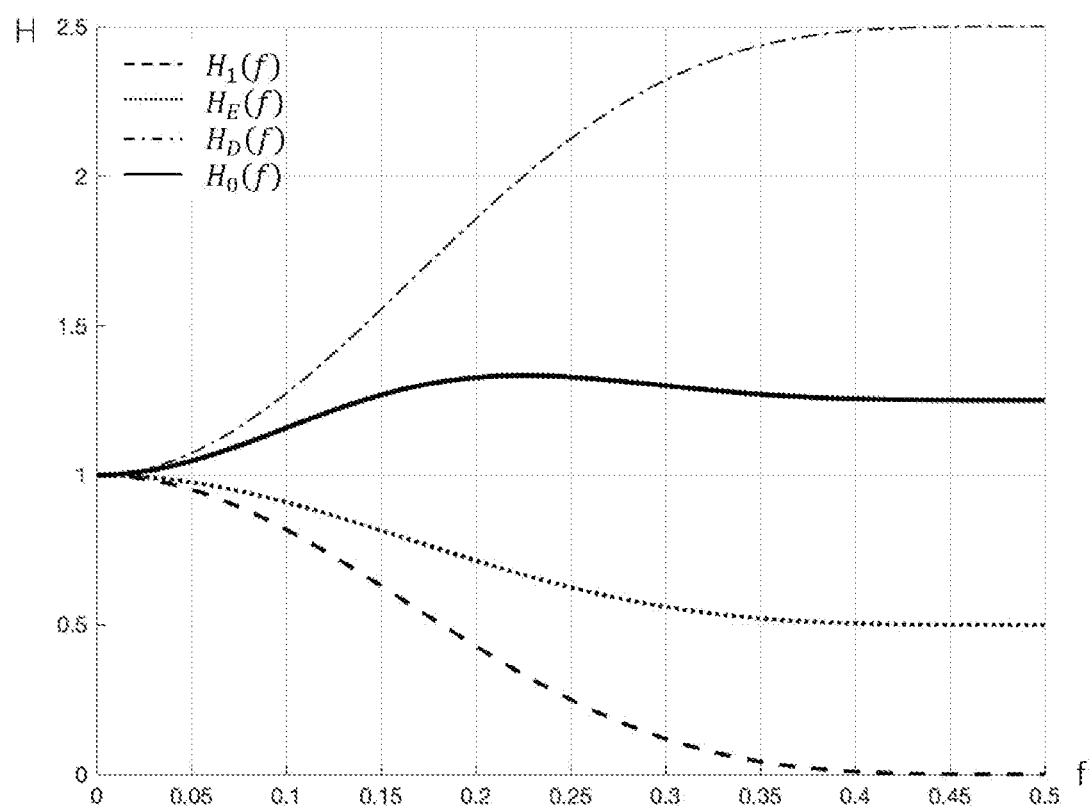
FIG. 10B is a graph showing curves of a global modulation function $H_0(f)$, a boundary adjustment function $H_1(f)$, and a decoding function $H_2(f)$ in enhanced mode according to some exemplary embodiments of this disclosure.

FIG. 10A is a graph of curves of a global modulation function $H_0(f)$, an encoding function $H_1(f)$, an encoding transfer function $H_E(f)$, and a decoding transfer function $H_D(f)$ in normal mode according to some exemplary embodiments of this disclosure. FIG. 10B is a graph of curves of a global modulation function $H_0(f)$, an encoding function $H_1(f)$, an encoding transfer function $H_E(f)$, and a decoding transfer function $H_D(f)$ in enhanced mode according to some exemplary embodiments of this disclosure. Encoding convolution kernels and decoding convolution kernels used in FIG. 10A and FIG. 10B are the same, and are all convolution kernels shown in Table 1. In FIG. 10A, the boundary adjustment coefficient $g_1$ is equal to 0.5, and the boundary compensation coefficient $g_2$ is equal to 0.96. In FIG. 10B, the boundary adjustment coefficient $g_1$ is equal to 0.5, and the boundary compensation coefficient $g_2$ is equal to 1.6. In FIG. 10A and FIG. 10B, a horizontal axis is a normalized frequency $f$, and a vertical axis is an amplitude modulation gain H. As shown in FIG. 10A, the global spectrum modulation function $H_0(f)$ in any frequency region is approximately equal to 1; and the global spectrum modulation function $H_0(f)$ performs spectrum modulation on the decompressed frame in normal mode, that is, information of all frequencies is fully retained in the global spectrum modulation function $H_0(f)$, and data in the decompressed frame may be basically restored to the data in the original frame. As shown in FIG. 10B, the global spectrum modulation function $H_0(f)$ in the low-frequency region is approximately equal to 1; and the global spectrum modulation function $H_0(f)$ in the intermediate-frequency to high-frequency region is greater than 1. The global spectrum modulation function $H_0(f)$ performs spectrum modulation in enhanced mode on the intermediate-frequency to high-frequency region in the decompressed frame, that is, the global spectrum modulation function $H_0(f)$ enhances information in the intermediate-frequency to high-frequency region. The data in the intermediate-frequency to high-frequency region in the decompressed frame is enhanced in comparison with the data in the intermediate-frequency to high-frequency region in the original frame. It should be noted that the curves shown in FIG. 10A and FIG. 10B are only exemplary illustrations. A person skilled in the art should understand that the curves of $H_0(f)$, $H_1(f)$, $H_E(f)$, and $H_D(f)$ are not limited to the forms shown in FIG. 10A and FIG. 10B. All curves of $H_0(f)$, $H_1(f)$, $H_E(f)$, and $H_D(f)$ that comply with the formula (18) and the formula (19) fall within the protection scope of this disclosure.

In summary, when compressing the original data, the data processing system 100 provided in this disclosure may perform the method P200 by using the data compression device 200. To be specific, the original frame in the original video data may be divided into a plurality of units, the amplitude of each unit in the intermediate-frequency to high-frequency region is obtained, and the amplitude of each unit in the intermediate-frequency to high-frequency region is modulated by using different boundary adjustment coefficients, so that the amplitude of the original frame in the intermediate-frequency to high-frequency region is decreased. If the amplitude of the current unit in the intermediate-frequency to high-frequency region is large, which represents that the current unit includes a strong boundary, a boundary adjustment coefficient greater than 0 and less than 1 is used to modulate the amplitude of the current unit in the intermediate-frequency to high-frequency region to decrease the amplitude of the current unit in the intermediate-frequency to high-frequency region, thereby reducing signal strength of the current unit in the intermediate-frequency to high-frequency region and reducing the amount of data information, so that data compression efficiency may be improved during the prediction and residual calculation. If the amplitude of the current unit in the intermediate-frequency to high-frequency region is small, which represents that the current unit includes a weak boundary, a boundary adjustment coefficient greater than 1 is used to modulate the amplitude of the current unit in the intermediate-frequency to high-frequency region to increase the amplitude of the current unit in the intermediate-frequency to high-frequency region, avoid a loss of the weak boundary in the current unit in the data compression (prediction and residual calculation) process, and avoid the loss of details. The data processing method P200 and system 100 can increase the amount of data information of the weak boundary while improving the data compression efficiency, to avoid the loss of details caused in the data compression process, that is, reduce data distortion while improving the data compression efficiency.

When performing data decompression on the compressed frame, the data processing system 100 provided in this disclosure performs the method P300 by using the data decompression device 300. To be specific, units in data compression may be used as units in data decompression, and the boundary compensation is performed for the amplitude of each unit in the intermediate-frequency to high-frequency region by using the boundary compensation coefficient corresponding to the boundary adjustment coefficient, to compensate for the amplitude decreased in the intermediate-frequency to high-frequency region in the data compression process and obtain the decompressed frame. The boundary compensation corresponds to the boundary adjustment, and a correspondence exists between the boundary compensation coefficient and the boundary adjustment coefficient. The boundary compensation can restore the definition of the compressed data that undergoes the boundary adjustment to the definition of the original frame, or even make the former higher than the definition of the original frame. In other words, without significantly increasing an amount of codec calculation, the decoder can at least restore definition of data at a salient frequency in decompressed data to the definition of the original frame, or can even obtain definition higher than that of the original frame. All boundary adjustment coefficients of the original frame in the boundary adjustment process are greater than 0, and no information in the compressed frame is lost. Therefore, the boundary adjustment coefficient and the boundary compensation coefficient can be designed based on the relationship between the boundary adjustment coefficient and the boundary compensation coefficient and features of the coefficients to restore information in the compressed frame. The method and system can significantly improve the data compression efficiency, improve data transmission efficiency, reduce the data loss, and avoid the loss of details, while eliminating noise and improving the definition of the decompressed data.

In addition, this disclosure provides a non-transitory storage medium. The non-transitory storage medium stores at least one set of executable instructions for data processing. When the executable instructions are executed by a processor, the executable instructions instruct the processor to implement steps of the data processing method P200. In some possible implementations, each aspect of this disclosure may be further implemented in a form of a program product, where the program product includes program code. When the program product operates on the data compression device 200, the program code is used to enable the data compression device 200 to perform the data processing steps described in this disclosure. The program product for implementing the foregoing method may use a portable compact disc read-only memory (CD-ROM) and include program code. In addition, the program product can run on the data compression device 200, for example, run on a personal computer. However, the program product in this disclosure is not limited thereto. In this disclosure, a readable storage medium may be any tangible medium containing or storing a program, and the program may be used by or in combination with an instruction execution system (for example, the compression processor 220). The program product may use any combination of one or more readable media. The readable medium may be a readable signal medium or a readable storage medium. For example, the readable storage medium may be but is not limited to an electronic, magnetic, optical, electromagnetic, infrared, or semi-conductor system, apparatus, or device, or any combination thereof. More specific examples of the readable storage medium include: an electrical connection with one or more conducting wires, a portable disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination thereof. The readable storage medium may include a data signal propagated in a baseband or as part of a carrier, where the data signal carries readable program code. The propagated data signal may be in a plurality of forms, including but not limited to an electromagnetic signal, an optical signal, or any appropriate combination thereof. Alternatively, the readable storage medium may be any readable medium other than the readable storage medium. The readable medium may send, propagate, or transmit a program to be used by or in combination with an instruction execution system, apparatus, or device. The program code contained in the readable storage medium may be transmitted by using any appropriate medium, including but not limited to wireless, wired, optical cable, RF, or the like, or any appropriate combination thereof. The program code for performing operations in this disclosure may be compiled in any combination of one or more programming languages. The programming languages include object-oriented programming languages such as Java and C++, and further include conventional procedural programming languages such as a "C" language or a similar programming language. The program code may be fully executed on the data compression device 200, partially executed on the data compression device 200, executed as an independent software package, partially executed on the data compression device 200 and partially executed on a remote computing device, or fully executed on a remote computing device. In a case in which a remote computing device is used, the remote computing device may be connected to the data compression device 200 through the transmission medium 120, or may be connected to an external computing device.

Specific embodiments of this disclosure have been described above. Some exemplary embodiments also fall within the scope of the appended claims. In some cases, actions or steps described in the claims may be performed in an order different from orders in the embodiments and still achieve expected results. In addition, the processes depicted in the drawings do not necessarily require a specific order or sequence to achieve the expected results. In some exemplary embodiments, multitask processing and parallel processing are also possible or may be advantageous.

In summary, after reading this detailed disclosure, a person skilled in the art will understand that the foregoing detailed disclosure may be presented by using examples only, and may not be restrictive. A person skilled in the art may understand that this disclosure is intended to cover various reasonable changes, improvements, and modifications to the embodiments, although this is not stated herein. These changes, improvements, and modifications are intended to be made in this disclosure and are within the spirit and scope of the exemplary embodiments of this disclosure.

In addition, some terms in this disclosure have been used to describe the embodiments of this disclosure. For example, "one embodiment", "some exemplary embodiments", and/or "some exemplary embodiments" mean/means that a specific feature, structure, or characteristic described with reference to the embodiment(s) may be included in at least one embodiment of this disclosure. Therefore, it can be emphasized and should be understood that in various parts of this disclosure, two or more references to "some exemplary embodiments" or "one embodiment" or "an alternative embodiment" do not necessarily all refer to the same embodiment. Further, specific features, structures, or characteristics may be appropriately combined in one or more embodiments of this disclosure.

It should be understood that in the foregoing description of the embodiments of this disclosure, to help understand one feature and for the purpose of simplifying this disclosure, various features in this disclosure are combined in a single embodiment, single drawing, or description thereof. However, this does not mean that the combination of these features is necessary. It is possible for a person skilled in the art to extract some of the features as a separate embodiment for understanding when reading this disclosure. In other words, some exemplary embodiments of this disclosure may also be understood as the integration of a plurality of sub-embodiments. It is also true when content of each sub-embodiment is less than all features of a single embodiment disclosed above.

Each patent, patent application, patent application publication, and other materials cited herein, such as articles, books, disclosures, publications, documents, and materials, is incorporated herein by reference. The contents thereof are applicable to all content used for all purposes, except for any history of prosecution documents associated therewith, any identical, or any identical prosecution document history, which may be inconsistent or conflicting with this document, or any such subject matter that may have a restrictive effect on the broadest scope of the claims associated with this document now or later. For example, if there is any inconsistency or conflict in descriptions, definitions, and/or use of a term associated with this document and descriptions, definitions, and/or use of the term associated with any material, the term in this document shall prevail.

Finally, it should be understood that the implementation solutions of this disclosure disclosed herein illustrate the principles of the implementation solutions of this disclosure. Other modified embodiments also fall within the scope of this disclosure. Therefore, the embodiments disclosed in this disclosure are merely exemplary and not restrictive. A person skilled in the art may use alternative configurations to implement the application in this disclosure according to the embodiments of this disclosure. Therefore, the embodiments of this disclosure are not limited to those embodiments described in this disclosure.

What is claimed is:

1. A data processing method, comprising:
    selecting an original frame from original data, wherein the original frame includes a preset number of bytes of the original data;
    performing data compression on the original frame to obtain a compressed frame; and
    sending the compressed frame to a transmission medium, wherein
    the performing of the data compression includes performing a boundary adjustment on an under-compression frame, wherein the under-compression-frame includes the original frame and data in any state before the original frame becomes the compressed frame during the data compression, and
    the boundary adjustment includes: for each unit of a plurality of units in the under-compression frame,
        modulating an amplitude of the unit in an intermediate-frequency to high-frequency region by using a boundary adjustment coefficient corresponding to the unit to decrease an amplitude of the under-compression frame in the intermediate-frequency to high-frequency region, wherein
        the boundary adjustment coefficient is greater than 0.

2. The data processing method according to claim 1, wherein the performing of the boundary adjustment on the under-compression frame includes:
    dividing the under-compression frame into the plurality of units based on a preset unit size; and
    for each unit of the plurality of units,
        modulating the amplitude of the unit in the intermediate-frequency to high-frequency region by using the boundary adjustment coefficient corresponding to the unit.

3. The data processing method according to claim 2, wherein for each unit, the modulating of the amplitude of the unit in the intermediate-frequency to high-frequency region by using the boundary adjustment coefficient corresponding to the unit includes:
    selecting a function from a preset encoding function group as an encoding function;
    modulating the unit by using the encoding function to obtain a first unit, so that a component of the unit in a low-frequency region in a frequency domain is retained while a component of the unit in the intermediate-frequency to high-frequency region is attenuated;

calculating a difference between the unit and the first unit to obtain a first boundary corresponding to the unit, wherein the first boundary includes the component of the unit in the intermediate-frequency to high-frequency region;

modulating an amplitude of the first boundary by using the boundary adjustment coefficient corresponding to the unit to obtain an encoding boundary corresponding to the unit; and superimposing the encoding boundary on the first unit.

4. The data processing method according to claim 3, wherein the modulating of the amplitude of the first boundary by using the boundary adjustment coefficient corresponding to the unit includes:

determining that a boundary value of the first boundary is less than a preset first threshold, and using the boundary adjustment coefficient that has a value greater than 1 to increase the amplitude of the first boundary; or determining that a boundary value of the first boundary is greater than a preset second threshold, using the boundary adjustment coefficient that has a value less than 1 to decrease the amplitude of the first boundary.

5. The data processing method according to claim 4, wherein the using of the boundary adjustment coefficient that has a value greater than 1 to increase the amplitude of the first boundary includes:

selecting a coefficient from a preset first boundary adjustment coefficient group as the boundary adjustment coefficient, and increasing the amplitude of the first boundary, wherein all coefficients in the first boundary adjustment coefficient group are greater than 1; and the using of the boundary adjustment coefficient that has a value less than 1 to decrease the amplitude of the first boundary includes:

selecting a coefficient from a preset second boundary adjustment coefficient group as the boundary adjustment coefficient, and decreasing the amplitude of the first boundary, wherein all coefficients in the second boundary adjustment coefficient group are less than 1.

6. The data processing method according to claim 3, wherein the modulating of the amplitude of the first boundary by using the boundary adjustment coefficient corresponding to the unit includes:

obtaining the boundary adjustment coefficient based on an optimization algorithm by using a weight value of a distortion rate and a weight value of a bit rate as optimization objects, and modulating the amplitude of the first boundary by using the boundary adjustment coefficient.

7. The data processing method according to claim 3, wherein the performing of the data compression on the original frame includes at least one of:

first performing the boundary adjustment on the original frame, and then performing a prediction on the original frame after the boundary adjustment and calculating a residual;

first performing a prediction on the original frame to obtain a predictive frame, and then performing the boundary adjustment on the original frame and the predictive frame and calculating a residual; or first performing a prediction on the original frame and calculating a residual, and then performing the boundary adjustment on the residual.

8. The data processing method according to claim 7, wherein the compressed frame further includes the encoding function and the boundary adjustment coefficient corresponding to each of the plurality of units.

9. A data processing system, comprising:
at least one storage medium storing a set of instructions for data processing; and
at least one processor in communication with the at least one storage medium, wherein during operation, the at least one processor executes the set of instructions to:
select an original frame from original data, wherein the original frame includes a preset number of bytes of the original data,
perform data compression on the original frame to obtain a compressed frame, and send the compressed frame to a transmission medium, wherein
to perform the data compression, the at least one processor further executes the set of instructions to:
perform a boundary adjustment on an under-compression frame, wherein the under-compression-frame includes the original frame and data in any state before the original frame becomes the compressed frame during the data compression, and
the boundary adjustment includes: for each unit of a plurality of units in the under-compression frame,
modulating an amplitude of the unit in an intermediate-frequency to high-frequency region by using a boundary adjustment coefficient corresponding to the unit to decrease an amplitude of the under-compression frame in the intermediate-frequency to high-frequency region, wherein
the boundary adjustment coefficient is greater than 0.

10. A data processing method, comprising:
obtaining compressed data that includes a compressed frame that includes a boundary adjustment obtained by performing data compression on an original frame; and
performing data decompression on the compressed frame to obtain a decompressed frame, wherein
the data decompression includes performing a boundary compensation on an under-decompression frame that under-decompression frame includes the compressed frame and any state of data before the compressed frame becomes the decompressed frame during the data decompression,
a preset association relationship exists between the boundary compensation and the boundary adjustment, and
the compressed data is obtained from a transmission medium.

11. The data processing method according to claim 10, wherein the boundary adjustment includes:
for each unit under-compression of a plurality of units under-compression in an under-compression frame,
modulating an amplitude of the unit under-compression in an intermediate-frequency to high-frequency region by using a boundary adjustment coefficient corresponding to the unit under-compression, so as to decrease an amplitude of the under-compression frame in the intermediate-frequency to high-frequency region, wherein
the boundary adjustment coefficient is greater than 0,
the under-compression frame includes the original frame and data in any state before the original frame becomes the compressed frame during the data compression, and
the boundary compensation includes:

for each unit under-decompression of a plurality of units under-decompression in the under-decompression frame, compensating for an amplitude of the unit under-decompression in an intermediate-frequency to high-frequency region based on the preset association relationship by using a boundary compensation coefficient corresponding to the boundary adjustment coefficient.

12. The data processing method according to claim 11, wherein the performing of the boundary adjustment on the under-compression frame includes:

dividing the under-compression frame into the plurality of units under-compression based on a first preset unit size; and for each unit under-compression, the modulating of the amplitude of the unit under-compression in the intermediate-frequency to high-frequency region by using the boundary adjustment coefficient corresponding to the unit under-compression includes:

selecting a function from a preset encoding function group as an encoding function, modulating the unit under-compression by using the encoding function to obtain a first unit, so that a component of the unit under-compression in a low-frequency region in a frequency domain is retained while a component of the unit under-compression in the intermediate-frequency to high-frequency region is attenuated, calculating a difference between the unit under-compression and the first unit to obtain a first boundary corresponding to the unit under-compression, wherein the first boundary includes the component of the unit under-compression in the intermediate-frequency to high-frequency region, modulating an amplitude of the first boundary by using the boundary adjustment coefficient corresponding to the unit under-compression to obtain an encoding boundary corresponding to the unit under-compression, and superimposing the encoding boundary on the first unit.

13. The data processing method according to claim 12, wherein the performing of the boundary compensation on the under-decompression frame includes:

dividing the under-decompression frame into the plurality of units under-decompression based on a second preset unit size; and for each unit under-decompression, compensating for the amplitude of the unit under-decompression in the intermediate-frequency to high-frequency region by using the boundary compensation coefficient corresponding to the boundary adjustment coefficient.

14. The data processing method according to claim 13, wherein for each unit under-decompression, the compensating for the amplitude of the unit under-decompression in the intermediate-frequency to high-frequency region by using the boundary compensation coefficient corresponding to the boundary adjustment coefficient includes:

determining a decoding function;

modulating the unit under-decompression by using the decoding function to obtain a second unit, so that a component of the unit under-decompression in a low-frequency region in frequency domain is retained while a component of the unit under-decompression in the intermediate-frequency to high-frequency region is attenuated;

calculating a difference between the unit under-decompression and the second unit to obtain a second boundary corresponding to the unit under-decompression, wherein the second boundary includes the component of the unit under-decompression in the intermediate-frequency to high-frequency region;

compensating for an amplitude of the second boundary by using the boundary compensation coefficient corresponding to the boundary adjustment coefficient to obtain a decoding boundary corresponding to the unit under-decompression; and superimposing the decoding boundary on the unit under-decompression.

15. The data processing method according to claim 14, wherein the determining of the decoding function includes:

selecting a function from a preset decoding function group as the decoding function.

16. The data processing method according to claim 14, wherein the compensating for the amplitude of the second boundary by using the boundary compensation coefficient corresponding to the boundary adjustment coefficient includes:

selecting a coefficient from a preset boundary compensation coefficient group as the boundary compensation coefficient; and compensating for the amplitude of the second boundary.

17. The data processing method according to claim 14, wherein the compressed frame includes:

the encoding function and the boundary adjustment coefficient corresponding to each unit under-compression of the plurality of units under-compression in the under-compression frame.

18. The data processing method according to claim 17, wherein the determining of the decoding function includes:

selecting, from a preset decoding function group, a function corresponding to the encoding function as the decoding function.

19. The data processing method according to claim 17, wherein the compensating for the amplitude of the second boundary by using the boundary compensation coefficient corresponding to the boundary adjustment coefficient includes:

determining the boundary compensation coefficient based on an association relationship between the boundary adjustment coefficient and the boundary compensation coefficient; and compensating for the amplitude of the second boundary.

20. The data processing method according to claim 10, wherein the performing of data decompression on the compressed frame includes at least one of:

first decoding the compressed frame, and then performing the boundary compensation;

performing the boundary compensation in the process of decoding the compressed frame; or first performing the boundary compensation on the compressed frame, and then decoding the compressed frame.

21. The data processing method according to claim 10, wherein the association relationship includes:

the boundary compensation enables an amplitude of the decompressed frame at any frequency in a low-frequency to intermediate-frequency region to be not less than 85% of an amplitude at any frequency in the low-frequency to intermediate-frequency region of the original frame.

22. The data processing method according to claim 21, wherein the association relationship further includes:

the boundary compensation enables an amplitude of the decompressed frame in an intermediate-frequency region to smoothly increase in comparison with an amplitude of the original frame in the intermediate-frequency region.

23. The data processing method according to claim 21, wherein the association relationship further includes:

the boundary compensation enables an amplitude of the decompressed frame in a high-frequency region to smoothly decrease in comparison with that of the original frame in the high-frequency region.

24. A data processing system, comprising:

at least one storage medium storing a set of instructions for data processing; and at least one processor in communication with the at least one storage medium, wherein during operation, the at least one processor executes the set of instructions to:

obtain compressed data that includes a compressed frame that includes a boundary adjustment obtained by performing data compression on an original frame; and perform data decompression on the compressed frame to obtain a decompressed frame, wherein the data decompression includes performing a boundary compensation on an under-decompression frame that under-decompression frame includes the compressed frame and any state of data before the compressed frame becomes the decompressed frame during the data decompression, a preset association relationship exists between the boundary compensation and the boundary adjustment, and the compressed data is obtained from a transmission medium.

\* \* \* \* \*